United States Patent [19]
Gretz

[11] Patent Number: 6,051,786
[45] Date of Patent: Apr. 18, 2000

[54] SIDING BOX

[75] Inventor: Thomas J. Gretz, Clarks Summit, Pa.

[73] Assignee: Arlington Industries, Inc., Scranton, Pa.

[21] Appl. No.: 09/002,575

[22] Filed: Jan. 3, 1998

Related U.S. Application Data

[63] Continuation-in-part of application No. 08/410,096, Mar. 24, 1995, Pat. No. 5,804,764.

[51] Int. Cl.[7] ...................................................... H01H 9/02
[52] U.S. Cl. ................................ 174/57; 174/53; 174/50; 220/4.02; 52/60; 298/205.1
[58] Field of Search ............................. 174/57, 53, 65 R, 174/50; 220/3.2, 3.3, 4.02; 52/60, 62; 248/205.1

[56] References Cited

U.S. PATENT DOCUMENTS

| | | | |
|---|---|---|---|
| 4,012,580 | 3/1977 | Arnold | 174/53 |
| 4,134,636 | 1/1979 | Kleinatland et al. | 439/535 |
| 4,794,207 | 12/1988 | Norberg et al. | 174/48 |
| 4,922,056 | 5/1990 | Larsson | 174/65 R |
| 5,223,673 | 6/1993 | Mason | 174/53 |
| 5,287,665 | 2/1994 | Rath, Jr. | 52/220.8 |
| 5,773,757 | 6/1998 | Kenney et al. | 174/53 |
| 5,877,450 | 3/1999 | Quin | 174/66 |

*Primary Examiner*—Kristine Kincaid
*Assistant Examiner*—Dhiru R Patel

[57] ABSTRACT

An two-piece siding box easily adapted for mounting various electrical devices such as outlets, switches, or light fixtures. The siding box including a mounting block and a face plate. One end of the mounting block is fastened to an outdoor surface of a building near an electrical source. The opposite end of the mounting block includes a peripheral wall and bosses within the peripheral wall that extend away from the surface of the building. An electrical device is fastened with screws to one or more bosses within the peripheral wall of the mounting block. The face plate includes a peripheral wall of a slightly smaller dimension than the peripheral wall of the mounting block. The face plate is brought in contact with the mounting block with the smaller peripheral wall of the face plate being slidingly engaged within the larger peripheral wall of the mounting block. A standard cover appropriate for the device mounted within the mounting block is then placed outside the face plate. A screw is fastened though the cover and into the device mounted within the mounting block to create the two-piece siding box.

7 Claims, 22 Drawing Sheets

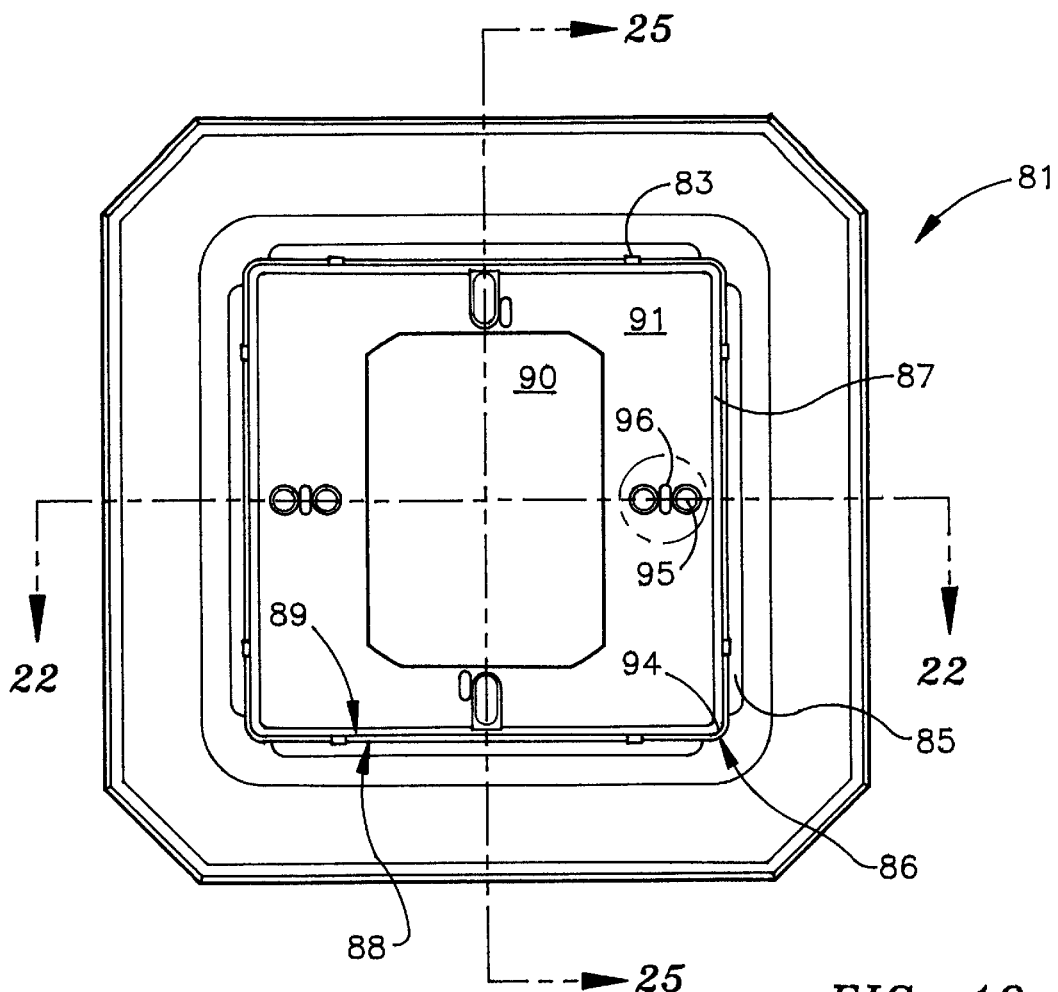
FIG. 19
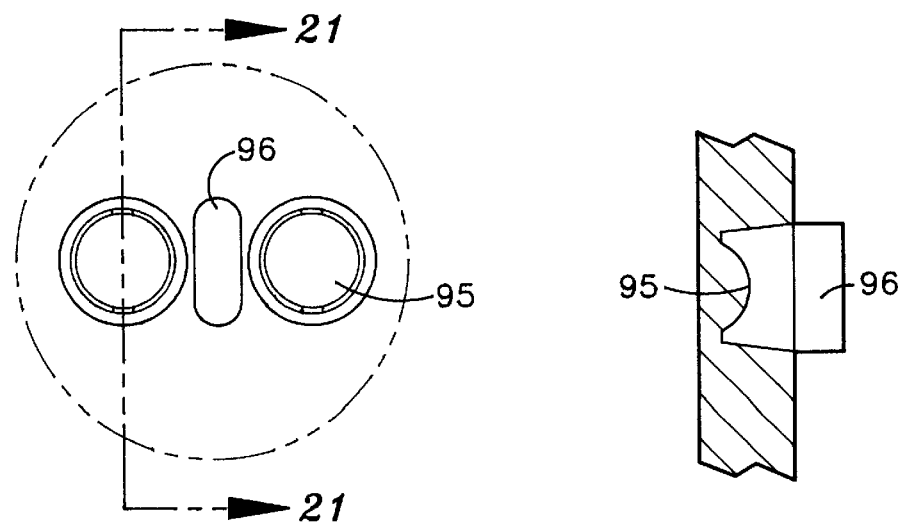
FIG. 20
FIG. 21

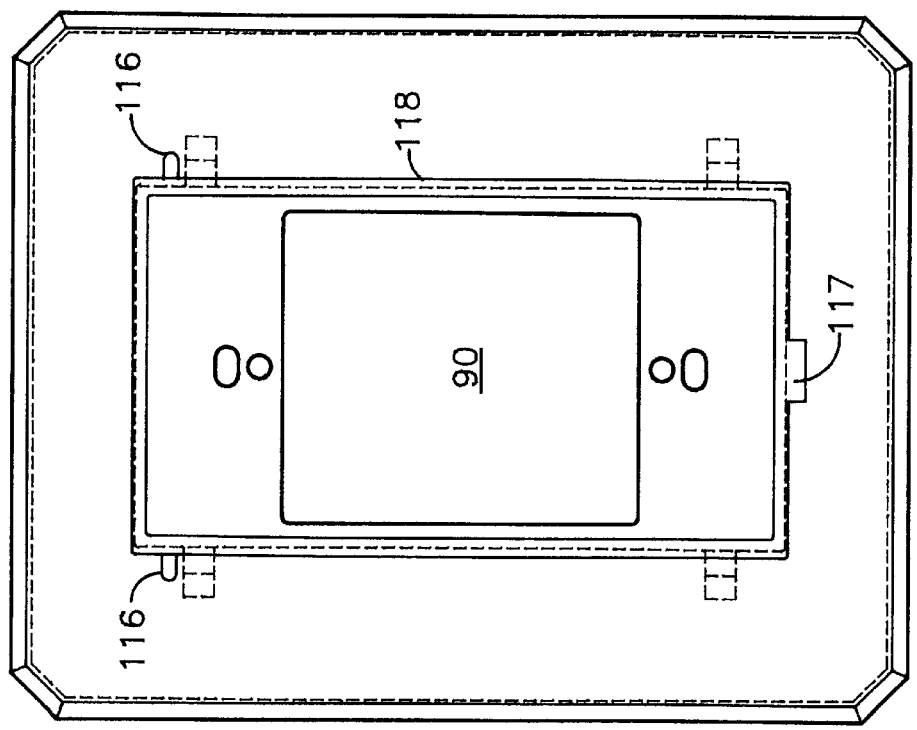
FIG. 38
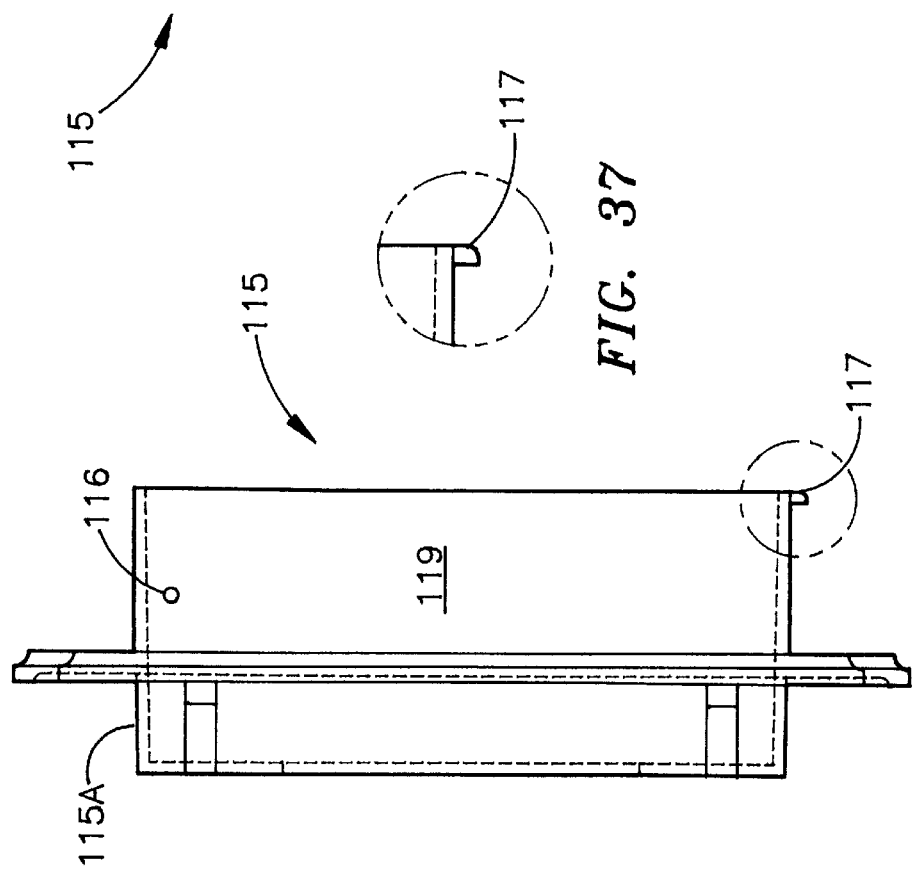
FIG. 37
FIG. 36

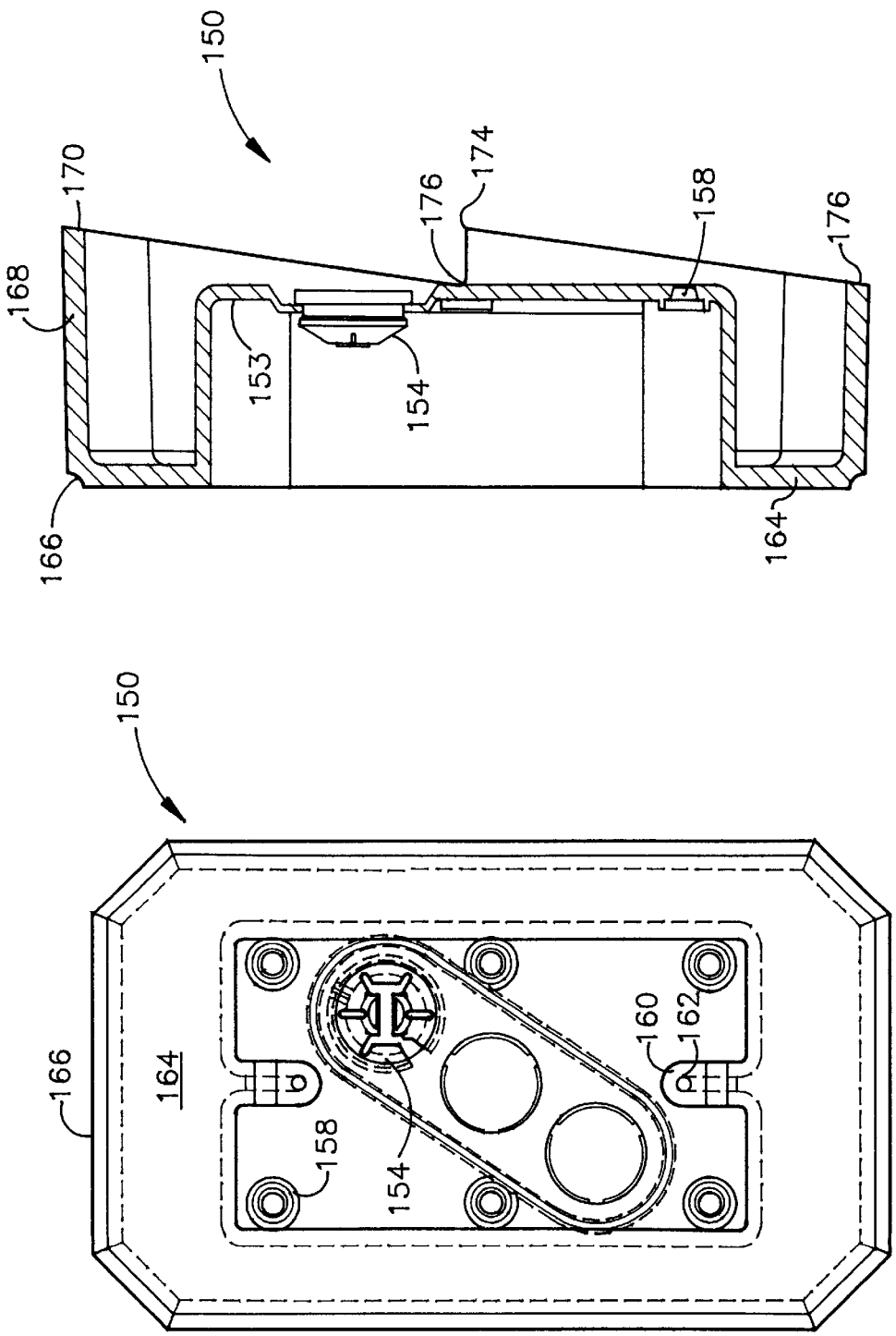

SIDING BOX

This application is a continuation-in-part of prior application Ser. No. 08/410,096 filed on Mar. 24, 1995, and now U.S. Pat. No. 5,804,764.

FIELD OF THE INVENTION

This invention relates to an electrical outlet box for mounting outdoors on a building to which outdoor fixtures such as lighting fixtures and outdoor receptacles may be attached.

BACKGROUND OF THE INVENTION

Devices for outdoor fixtures commonly feature several configurations to accommodate various fixtures or devices and are usually in the form of covers for standard electrical outlet boxes. A mounting block is commonly used to provide anchoring to an outdoor wall of a building. A face plate is usually provided in several configurations to provide a cover for an electrical outlet box, a pleasing pedestal for a fixture or device at its juncture with the building, and an opening for the passage of wiring or other connections between the fixture and the outlet box. These fixtures or devices are typically lighting fixtures or electrical receptacles but could be water faucets or other devices. As the openings for the various fixtures are of different sizes and shapes, manufacturers typically provide several face plates to accommodate the range of fixtures that are typically mounted on the exterior of buildings.

SUMMARY OF THE INVENTION

This invention provides several embodiments of an electrical outlet box and several embodiments of a face plate that can accommodate several standard fixtures including lighting fixtures, outdoor electrical receptacles, and other devices.

The preferred embodiment of the face plate contains a standard size opening that satisfies all applications. Another embodiment of the face plate may be adapted for various size openings by breaking away portions of the face plate.

The preferred embodiment of the mounting block may be installed as is on a bare wall that will have lap siding subsequently installed or may be adapted for attachment to an outdoor wall with lap siding in place by breaking away a flanged portion along pre-formed score lines. A second embodiment of the outlet box is a flangeless box that may be attached directly to an outdoor wall with lap siding in place by cutting an appropriately sized opening in the siding and inserting and anchoring the flangeless box therein.

Other embodiments for external siding outlet boxes, ground fault circuit interrupter boxes and similar devices are shown.

OBJECTS AND ADVANTAGES

A first object of the present invention is to provide a siding block unit which comprises a complete electrical junction box including a mounting block and a face plate. A standard electrical box is required to be used in conjunction with other siding blocks currently being used in the field. This invention eliminates the need to cut holes in the face plate to install a standard electrical box as required with other siding blocks. The present invention provides a secure junction box for completing electrical connections within the enclosure and an attractive face plate for the base of the installed fixture.

A second object of the present invention is to provide an outdoor electrical outlet box in one configuration that will accommodate several typical end uses. These end uses may be lighting or other electrical fixtures, single or duplex receptacles mounted either vertically or horizontally, single or duplex switches, ground fault interrupter switches, ground fault interrupter receptacles, or similar devices. Several embodiments of the mounting block and several embodiments of a face plate are provided for allowing the flexibility for accommodating these several end uses.

One embodiment of the face plate features breakaway portions that may be removed selectively to fit the application. Another embodiment of the face plate features a standard size opening to also accommodate several end uses.

Another object of the present invention is to provide an outdoor siding box which may be applied to an existing outdoor wall having lap siding or to a newly constructed outdoor wall on which lap siding will subsequently be applied. One embodiment of the electrical outlet box has a mounting plate with a breakaway flange to accomplish this. If being applied to a new wall, the flange is kept intact with the box and the lap siding is cut to buttress an extended portion of the box. If being applied to an existing wall having lap siding, the flange is broken away and is fitted inside an aperture cut in the siding to accommodate the box.

A second embodiment of the electrical outlet box is a flangeless box which may be applied to an existing wall. For this embodiment, the box is fitted inside an aperture cut in the siding with no existing flange to break away.

A third embodiment of the electrical outlet box incorporates several improvements including thinner walls around the knock-outs, allowing them to be knocked out instead of drilled out, and spacing the knock-outs closer to the perimeter of the box so that more room is available for wiring to enter from adjacent knock-outs without interfering with each other. An additional improvement has the knock-outs recessed so that a C-shaped electrical cable fitting may be snapped into a knock-out from the rear of the box and not protrude beyond the rear surface of the box.

An object of a third embodiment of a face plate incorporates ribs that create a friction fit of the face plate within a mounting block. The ribs permit the face plate to be mounted to the mounting block without a gasket and also allow any water which enters the assembled siding box to run out.

Other objects and advantages of the present invention will be better understood from the following description when read in conjunction with the appropriate drawings.

DESCRIPTION OF THE DRAWINGS

FIG. 19 is a rear view of still another embodiment of a face plate that is used as a face plate for the mounting block shown in FIG. 13.

FIG. 20 is a detail view of a section of the face plate shown in FIG. 19.

FIG. 21 is a cross-sectional view taken along line 21—21 of FIG. 20.

FIG. 36 is a side view of the face plate shown in FIG. 34.

FIG. 37 is a detail view of a lip portion of the face plate shown in FIG. 34.

FIG. 38 is a front view of the face plate of FIG. 34.

FIG. 42B is the top view of the one-piece rectangular siding mounting block of FIG. 41.

FIG. 43 is a random cross-sectional side view of the mounting block of FIG. 42.

DESCRIPTION OF THE INVENTION

The present invention comprises a siding box and face plate assembly that combine to form an outdoor mount adaptable for various fixtures. Various embodiments of the box and of the face plate are provided. For decorative purposes, two versions of one embodiment of the face plate are provided, an octagon shaped face plate and an elongated octagon shaped face plate.

The face plate has one standard size opening and will work in conjunction with this embodiment of the mounting block. Another embodiment of the face plate has breakaway portions to allow configuring it for various electrical fixtures and devices.

The first embodiment of the box is a flanged mounting block that has breakaway lines that allow removal of an outer peripheral flange when the box is to be installed on an outdoor wall which has had siding previously installed. Another embodiment of the box, a flangeless version, may be installed in an opening cut in the siding on an outdoor wall and eliminates the need to remove a flange from the outer periphery of the box prior to installation.

Figure 1:
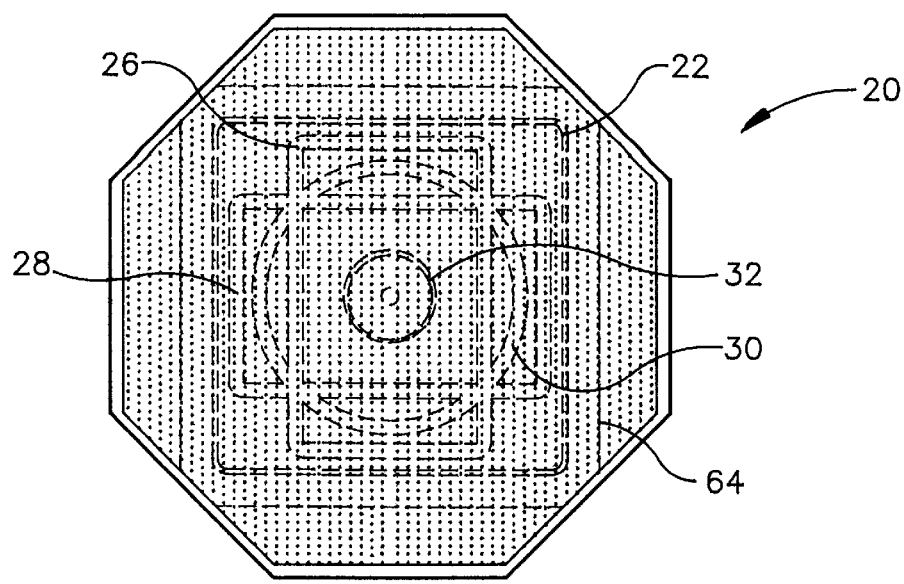
FIG. 1 is a front view of a face plate of a first embodiment of the present invention having an octagon shape with breakaway portions shown in single dashed lines.

A front view of a first embodiment of a face plate 20 in an octagon shape is depicted in FIG. 1. Breakaway portions are shown in single dashed lines. The location of an integral continuous wall 22 is shown in double dashed lines.

Figure 2:
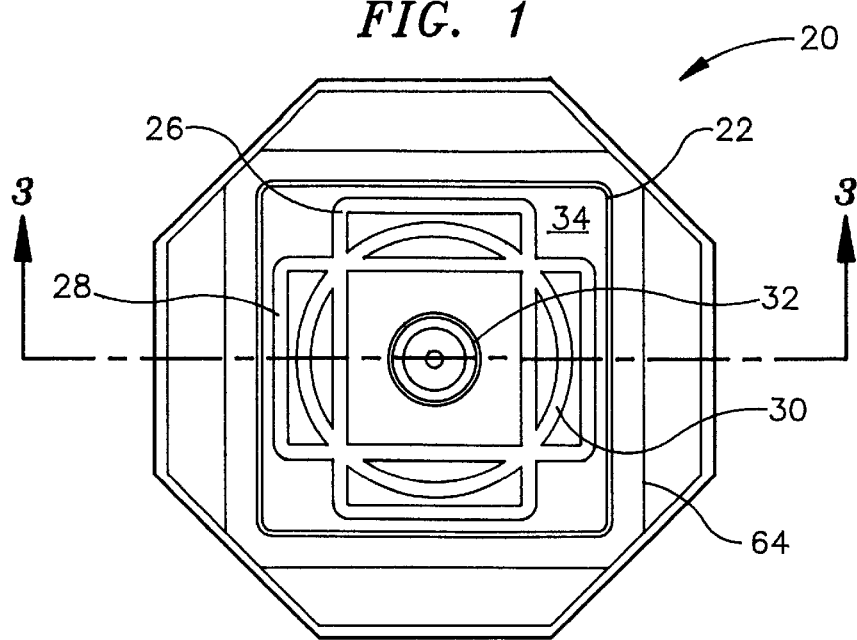
FIG. 2 is a view of the back of the face plate shown in FIG. 1.

FIG. 2 gives a back view of the first embodiment of the face plate. The integral continuous wall 22 extends from the back surface 34 of the face plate. Depicted in FIG. 2 are breakaway grooves 26 for the mounting of a vertical electrical receptacle, breakaway grooves 28 for the mounting of a horizontal electrical receptacle, breakaway grooves 30 for the mounting of a circular light fixture, and breakaway grooves 32 for the mounting of a water faucet. A line 64 is provided outwardly of the continuous wall 22 for outlining the shape of the octagon shaped face plate to a square shape with chamfered corners.

Figure 3:
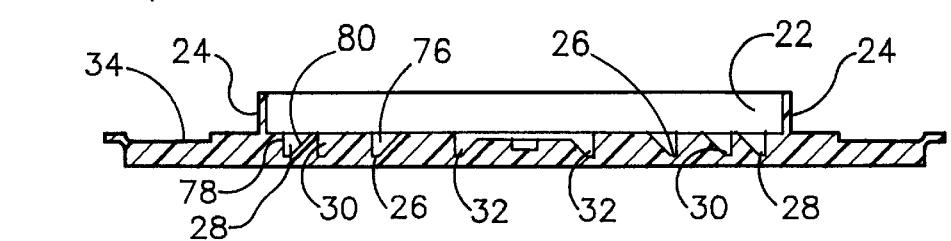
FIG. 3 is a cross-sectional view of the first embodiment of the face plate taken along lines 3—3 of FIG. 2 and showing the front side of the face plate at the bottom of the figure and the back side with the integral wall at the top.

FIG. 3 is a cross-sectional view of the octagon shaped face plate 20 taken along lines 3—3 of FIG. 2 and showing the integral continuous wall 22 extending perpendicularly from the back surface 34. An outer surface 24 of the continuous wall 22 is shown. Breakaway grooves are shown for a horizontal electrical receptacle 28, a lighting fixture 30, a vertical electrical receptacle 26, and a lighting fixture or other device 32. The breakaway grooves are V-shaped cuts 76 formed in the back surface 34 of the face plate 20. The V-shaped cuts are formed with a short side 78 and a long side 80 of the V. To configure the face plate 20 for a given application, the desired breakaway portion is removed by scoring with a razor knife in the proper breakaway groove and then hammering or breaking out the proper portion. The design of the V-shaped grooves 76 which extend through most of the face plate's thickness with a short side 78 and a long side 80 guides the razor knife for easy scoring of the face plate for the proper configuration.

Figure 4:
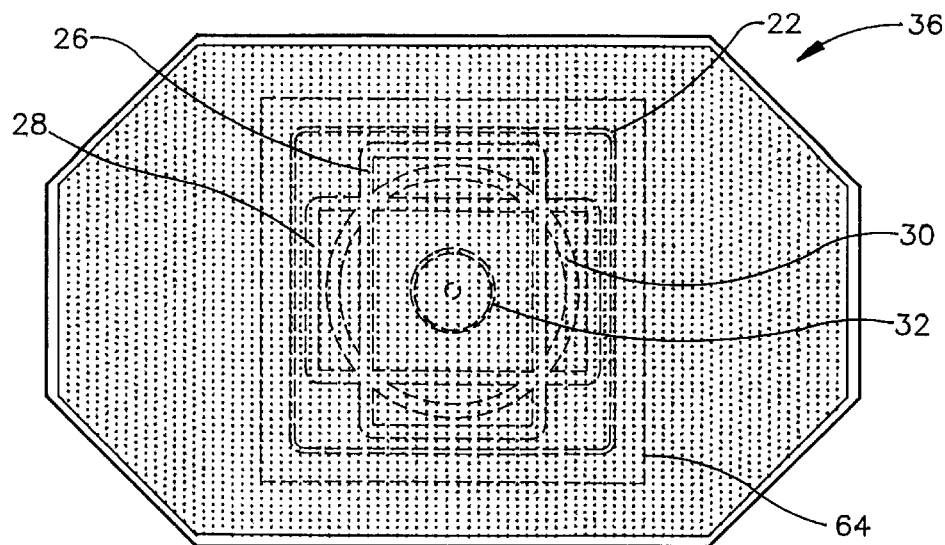
FIG. 4 is a front view of another version of the first embodiment of the face plate of the present invention having an elongated octagon shape with breakaway portions shown in single dashed lines.
Figure 5:
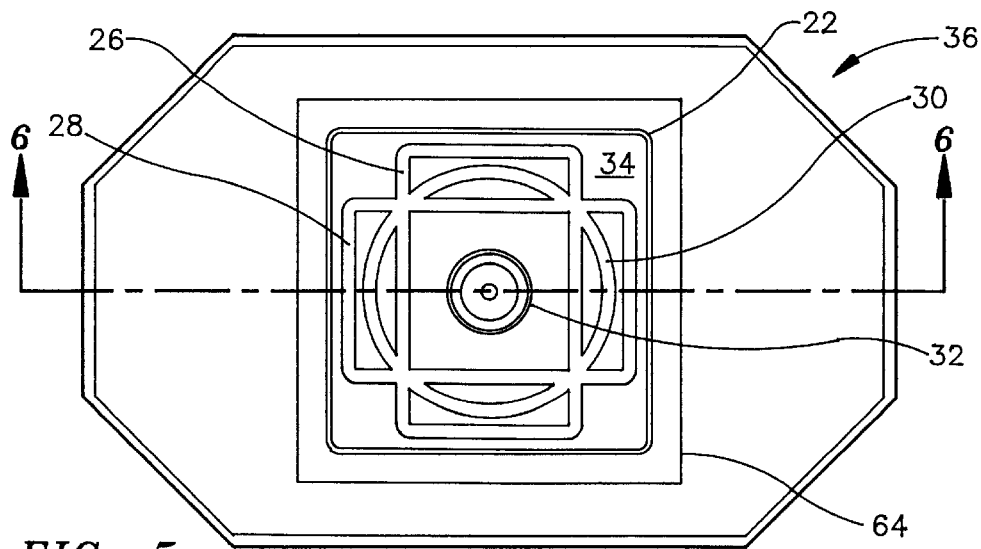
FIG. 5 is a view of the back of the face plate shown in FIG. 4.

FIG. 4 is a front view of an elongated octagon shaped face plate 36 of the present invention, another decorative version of the first embodiment of the face plate. FIG. 5 is a view of the back surface 34 of the elongated octagon face plate 36. The relative location of the breakaway grooves for the vertical electrical receptacle 26, the horizontal electrical receptacle 28, the light fixture 30, and the water faucet or similar device 32 are shown in FIGS. 4 and 5.

Figure 6:
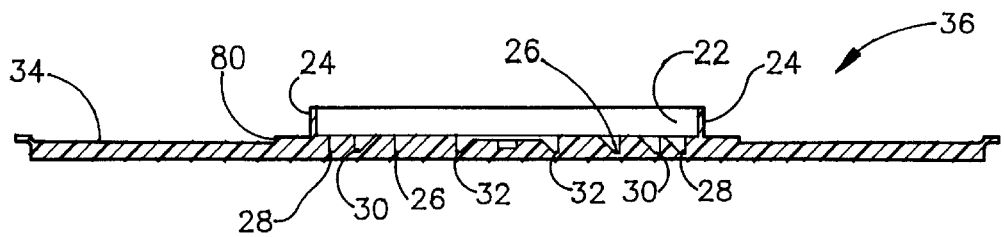
FIG. 6 is a cross-sectional view taken along lines 6—6 of FIG. 5 showing the front side of the face plate at the bottom of the figure and the back side with the integral wall at the top.

FIG. 6 is a cross-sectional view of the elongated octagon shaped face plate taken along lines 6—6 of FIG. 5 and showing the back surface 34 of the face plate at the top of the figure. The integral continuous wall 22 with outer surface 24 extends perpendicularly from the back surface 34 of the face plate 36. V-shaped grooves are shown for the horizontal electrical receptacle 28, the light fixture 30, the vertical electrical receptacle 26, and the water faucet 32. The elongated octagon shaped face plate 36 has relief line 64 for aesthetic reasons.

Figure 7:
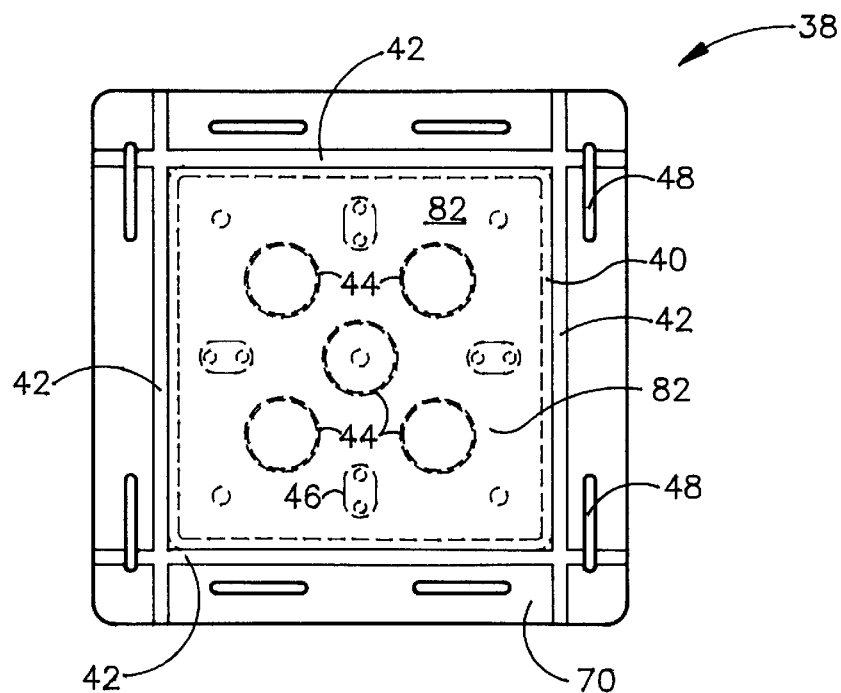
FIG. 7 is a rear view of the electrical outlet box of the present invention with the integral peripheral wall, knockouts and bosses shown in dashed lines.

FIG. 7 is a rear view of a first embodiment of the mounting block 38 including breakaway grooves 42 formed in the rear surface 82. The breakaway grooves 42 are positioned immediately outside the outer periphery of an integral peripheral wall 40 on the opposite side of the box 38.

Figure 8:
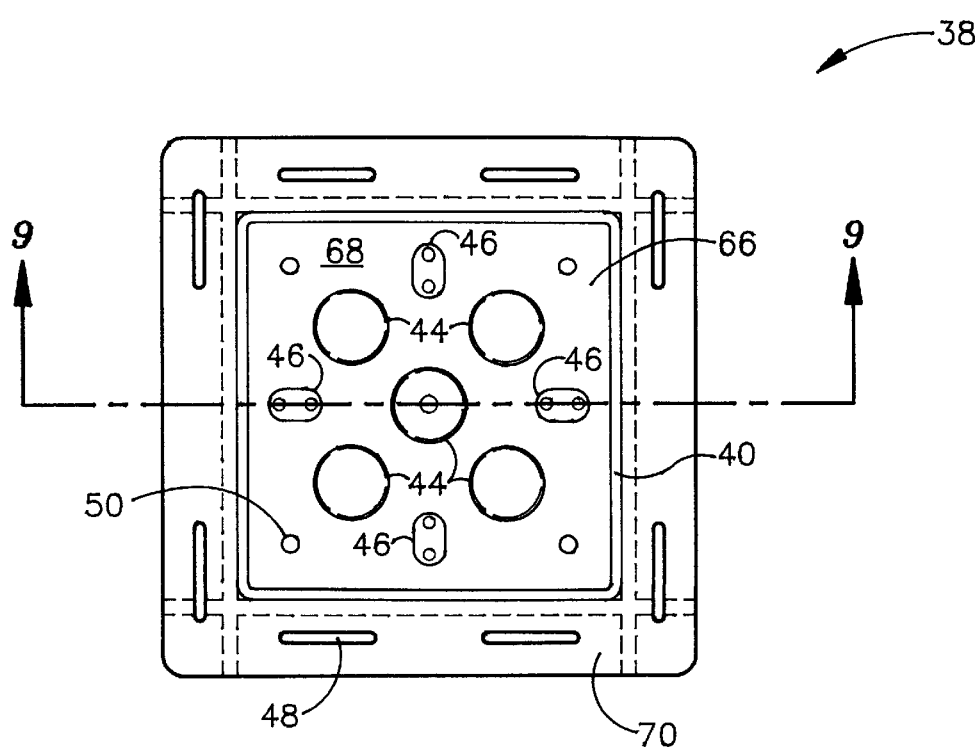
FIG. 8 is a front view of the box of FIG. 7.

The integral peripheral wall 40 is shown better in FIG. 8, a front view of the first embodiment of the box. The box 38 is comprised of a rear wall 66 having a front surface 68. Extending from the front surface 68 is the integral peripheral wall 40 and several bosses 46. Recessed knockout sections 44 are provided on the rear wall 66 for creating openings for bringing in electrical or plumbing lines, depending on the application. Extending from the rear wall 66 in substantially the same plane as the rear wall is an integral flange 70. Areas for connecting the box 38 to an outdoor wall are provided exterior of the peripheral wall 40 by slots 48 in the integral flange 70 and interior of the peripheral wall 40 by mounting holes 50. If the box 38 is installed on an unfinished exterior wall then the box will typically be secured by nails or other fastening means through slots 48 in integral flange 70.

Figure 9:
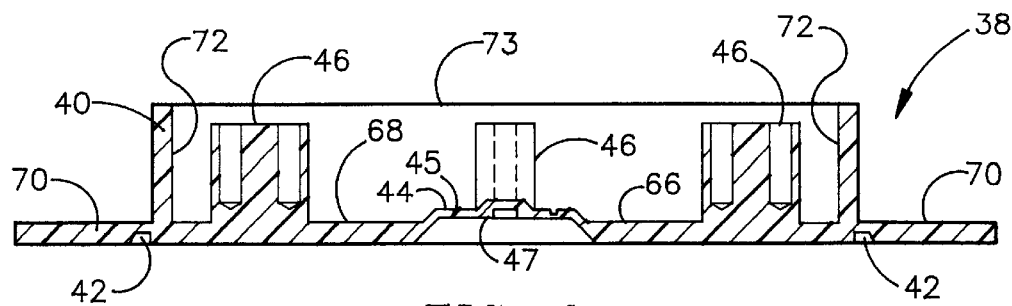
FIG. 9 is a cross-sectional view of the box taken along lines 9—9 of FIG. 8 and showing at the top of the figure the bosses and integral peripheral wall extending from the front surface of the box.

FIG. 9 is a cross-sectional view of the first embodiment of box 38 taken along lines 9—9 of FIG. 8 and showing the bosses 46 and the integral peripheral wall 40 extending from the front surface 68 of the box. Integral peripheral wall 40 has an inner surface 72 and an edge 73. Integral flange 70 is shown extending from the rear wall 66 in the same plane as the rear wall 66 of the box 38. Recessed knockout sections 44 on the rear wall 66 has score lines 45 to permit the center knockout section 47 to provide a recessed opening. Low profile connectors are usable in such recessed openings such as those shown in U.S. Pat. Nos. 5,442,141 and 5,693,910 owned by assignee. Such permits the rear wall to be flush with the surface to which it is mounted without having to cut a large hole for use with the connector. FIGS. 42A, 52B, 47 and 48 show the use of such connectors.

Figure 10:
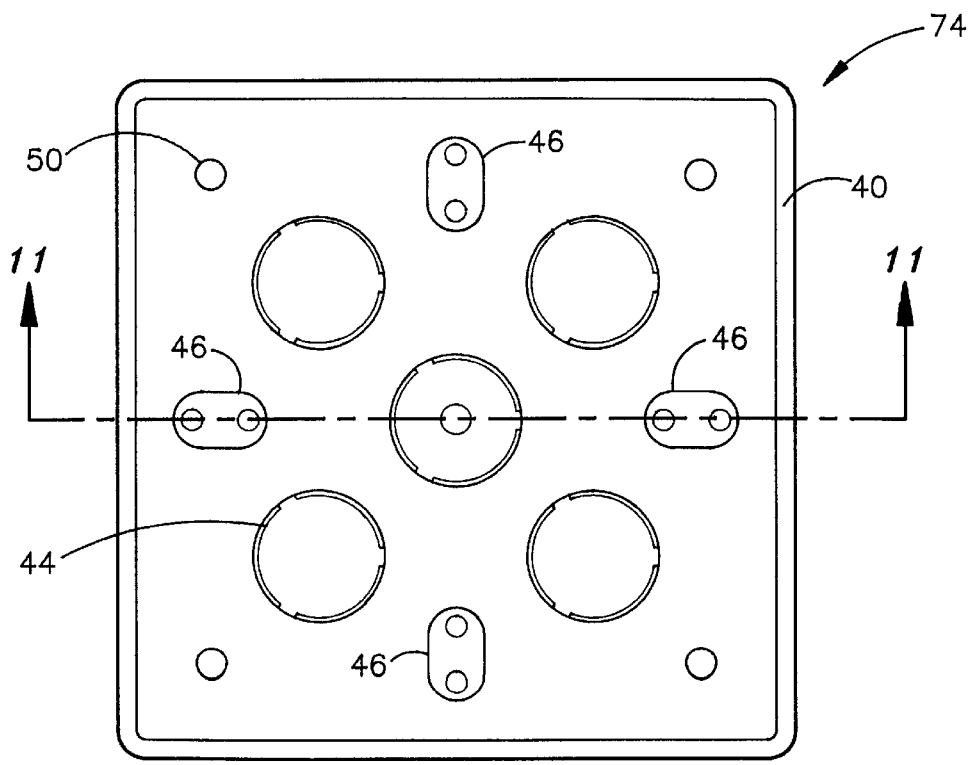
FIG. 10 is a front view of the box of FIG. 7 with the integral flange broken away or omitted, or of a flangeless box which is a second embodiment of the outlet box, as they would appear when mounting the box on an existing outdoor wall having lapped siding already installed.

FIG. 10 depicts another embodiment of the box 74 with the integral flange 70 omitted, as it would be if it were installed on a finished wall in which the siding is already in place. FIG. 10 would also be a depiction of the embodiment of the box with the flange broken away. For the flangeless embodiment of the box or for the flanged embodiment with the flange broken away, an aperture is formed in the siding of a size approximate the outer periphery of the integral peripheral wall 40, integral flange 70 is broken away or omitted at the outer periphery of the integral peripheral wall 40, and the flangeless box 74 is slipped into the aperture. The flangeless box 74 is then secured to the underlayment wall by means of nails or other fastening means through mounting holes 50 and caulking may be applied around the periphery.

Figure 11:
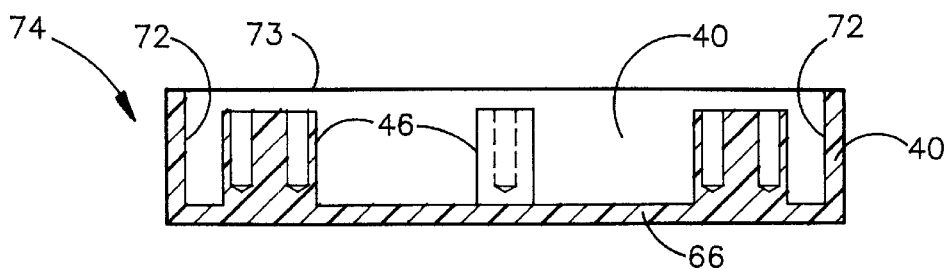
FIG. 11 is a cross-sectional view of the box taken along lines 11—11 in FIG. 10.

FIG. 11 is a cross-sectional view of the flangeless embodiment of the box 74 taken along line 11—11 of FIG. 10. The integral peripheral wall 40 with inner surface 72 and edge 73 is depicted along with bosses 46 extending from rear wall 66.

The mounting block and face plates are typically constructed of General Electric's Noryl plastic or similar heat resistant plastic. Heat generated by the fixture can transfer through the screws which are mounted into the box, holding the fixture or device up. If the box is constructed of a non-heat resistant plastic such as PVC, the screws can receive heat from the fixture and degrade the strength of the non-heat resistant plastic thereby causing the fixture to fall.

Figure 12:
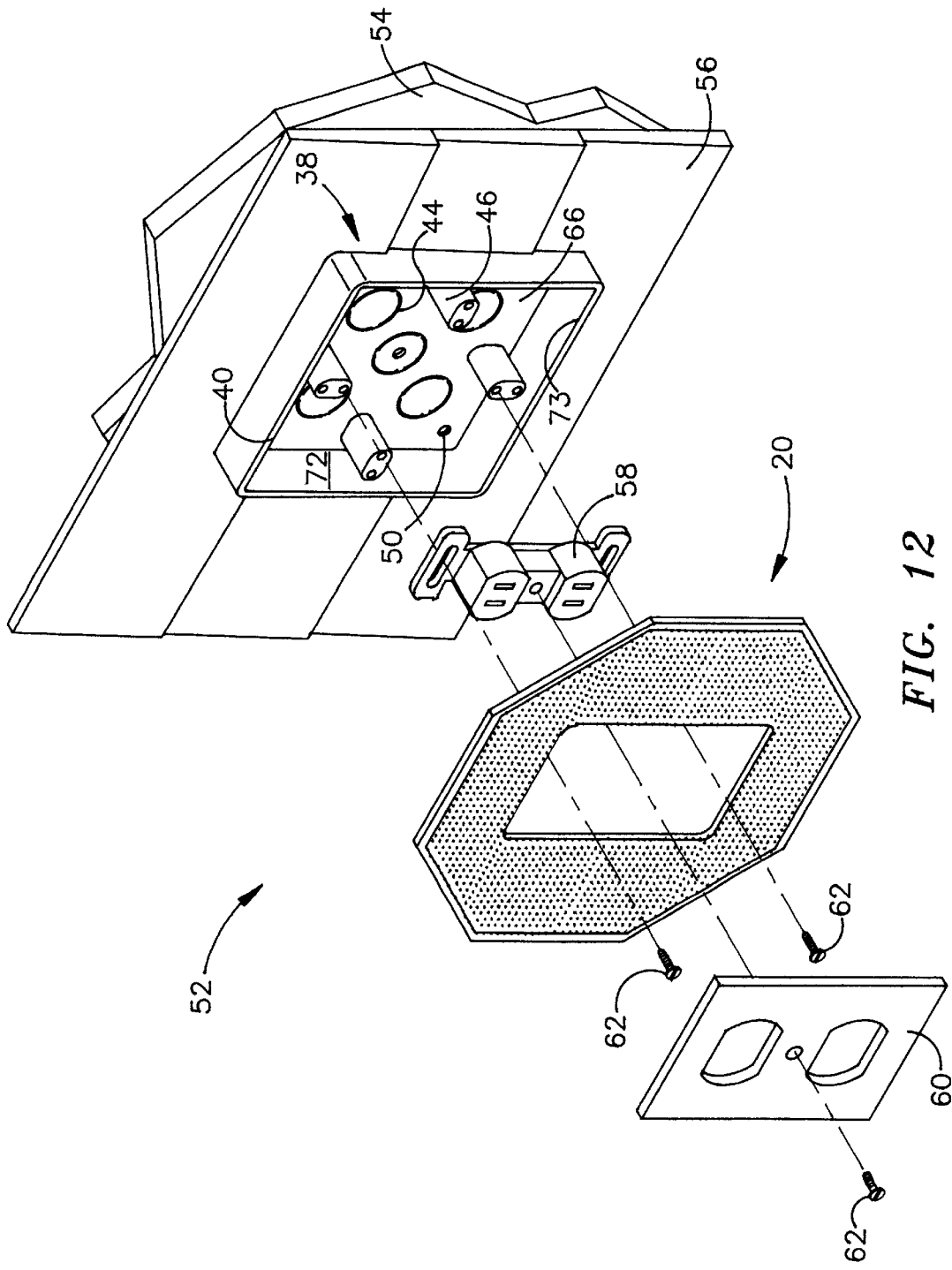
FIG. 12 is a exploded perspective view of the box secured within lapped siding, an electrical receptacle in a vertical orientation, an octagon shaped face plate and a receptacle cover in the proper sequence for installation on the exterior wall of a building.

FIG. 12 is an exploded perspective view of the first embodiment of the siding box assembly 52. Shown in FIG. 12 is a mounting block secured within lapped siding 56, an electrical receptacle 58 in a vertical orientation, an octagon shaped face plate 20 and a receptacle cover 60 in the proper sequence for installation on the exterior wall of a building. Octagonal face plate 20 has had the proper portion removed to configure it for a vertical receptacle by scoring with a razor knife along the proper V-shaped groove and breaking out the proper portion. The box in this figure could be either the flanged or flangeless type as no distinction is made in the drawing as to means of installation. The box is secured to the underlayment wall 54 by nails or other fastening means through either slots in the integral flange or mounting holes 50 in the rear wall 66 of the flangeless embodiment of the box. The flanged embodiment of the box is typically used on new walls in which siding is being applied. The flangeless embodiment of the box is typically used on existing walls having siding in place.

FIG. 12 therefore shows the box 38 secured to the outdoor wall with siding extending to the outer periphery of the peripheral wall 40. Peripheral wall 40 has an inner surface 72 and an edge 73. Electrical receptacle 58 is oriented vertically and secured with screws 62 in integral bosses 46 extending from the rear wall 66 of the box. One or more of knockouts 44, although shown intact in the drawing, may be removed for providing an electrical cable. An octagon shaped face plate 20 is then inserted into the box 38 so that the exterior periphery of the face plate's integral wall 22 (not depicted) is loosely received within the interior periphery of the peripheral wall 40 of the box. Once inserted, the exterior surface of the integral wall of face plate 20 (not depicted) is contiguous with the inner surface 72 of the peripheral wall 40 of the box 38. If desired, the integral wall 22 of the face plate and the peripheral wall 40 of the box may mate in a frictional fit rather than a loose fit, but the loose fit is desired. The integral wall of the face plate 20 is inserted within the peripheral wall 40 of the box 38 until the edge 73 of the peripheral wall 40 contacts the back surface (not depicted) of the face plate 20. Face plate 20 is then held to the box 38 in this application depicted in FIG. 12 by securing a standard receptacle cover 60 to the electrical outlet 58 by means of screw 62.

In a manner analogous to that depicted in FIG. 12 and described above, the box and first embodiment of the face plate may be combined with a horizontal electrical receptacle, a light fixture, or a water faucet by properly scoring and removing the proper portion delineated by the V-shaped grooves in the back side of the face plate. The first embodiment of the face plate with its standard size opening may be combined with any of these same devices. The face plate employed in the installation may be either the octagon or elongated octagon shape.

Figure 13:
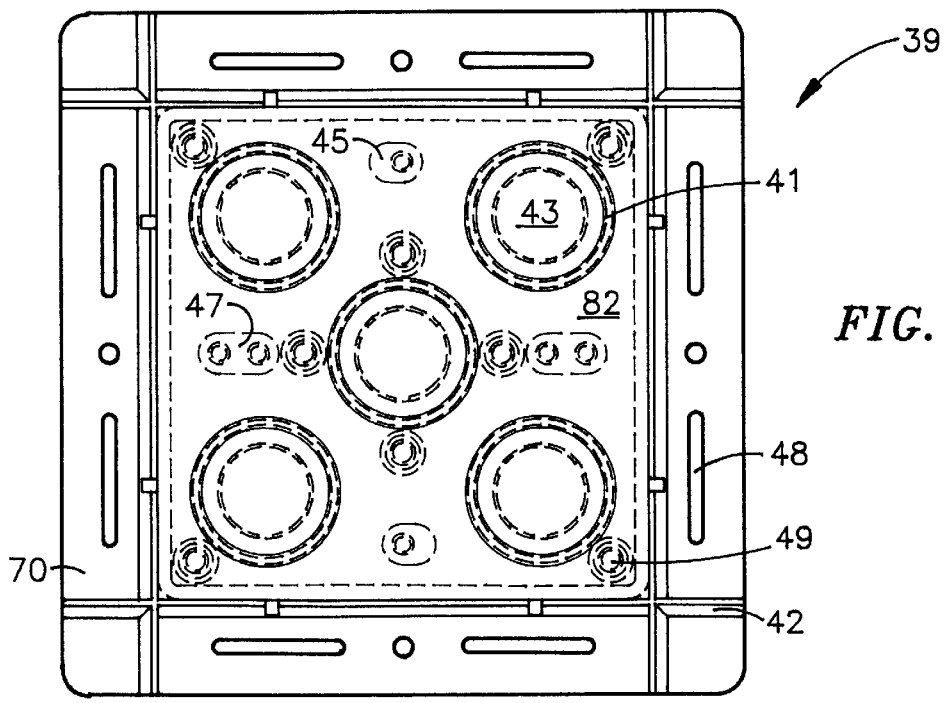
FIG. 13 is a rear view of another embodiment of a mounting block.

FIG. 13 is a rear view of another embodiment of a mounting block portion of a two-piece siding box. This embodiment of the mounting block 39 includes improved knock-outs 43 which have thinner walls around their peripheries 41. The knock-outs may be easily popped out with a hammer and screwdriver or even with bare fingers if desired.

Figure 14:
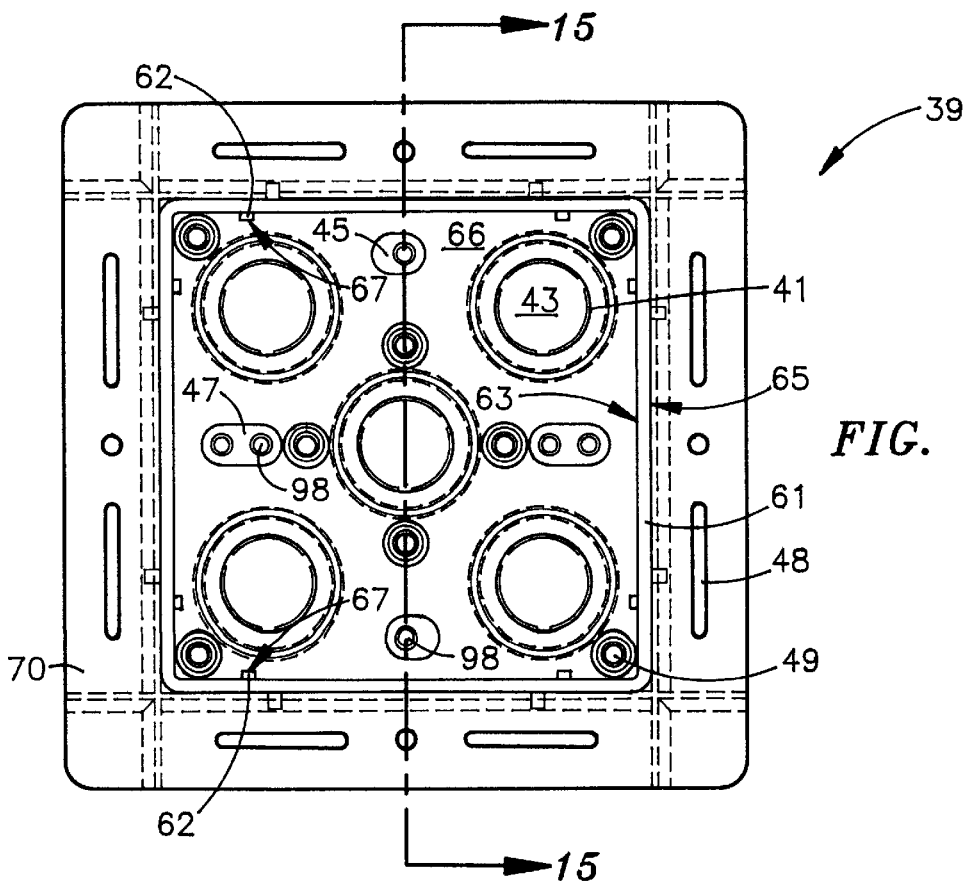
FIG. 14 is a front view of the mounting block shown in FIG. 13.

FIG. 14 is a front view of the mounting block 39 shown in FIG. 13. Comparing the knock-outs 43 of the embodiment of the mounting block 39 of FIG. 14 with the embodiment of the mounting block 38 of FIG. 7 will show that the knock-outs 43 in this embodiment are spaced farther from each other and closer to the edge than in the first embodiment. This allows more room for electrical leads to enter the mounting block 39 of FIG. 14 and prevents the separate entries of wiring and cables from interfering with each other. This is important when space is at a premium for mounting large electrical devices such as ground fault circuit interrupters inside the mounting block 39.

As depicted in FIG. 13, breakaway grooves 42 are located in the back surface 82 of the mounting block 39 to allow breaking away the integral flange 70 for installing the block within existing lapped siding.

FIG. 14 depicts the position of single-hole bosses 45 and double-hole bosses 47 for the mounting of electrical receptacles, switches, and other devices. The mounting block 39 may be fastened to a surface by nails or screws applied through either slots 48 in integral flange 70 or through fastener recesses 49 molded into the rear wall 66 of the mounting block. A nail could be easily driven through a fastener recess 49 without any drilling. A screw could be used by first drilling an appropriately sized hole through one of the fastener recesses 49.

Figure 15:
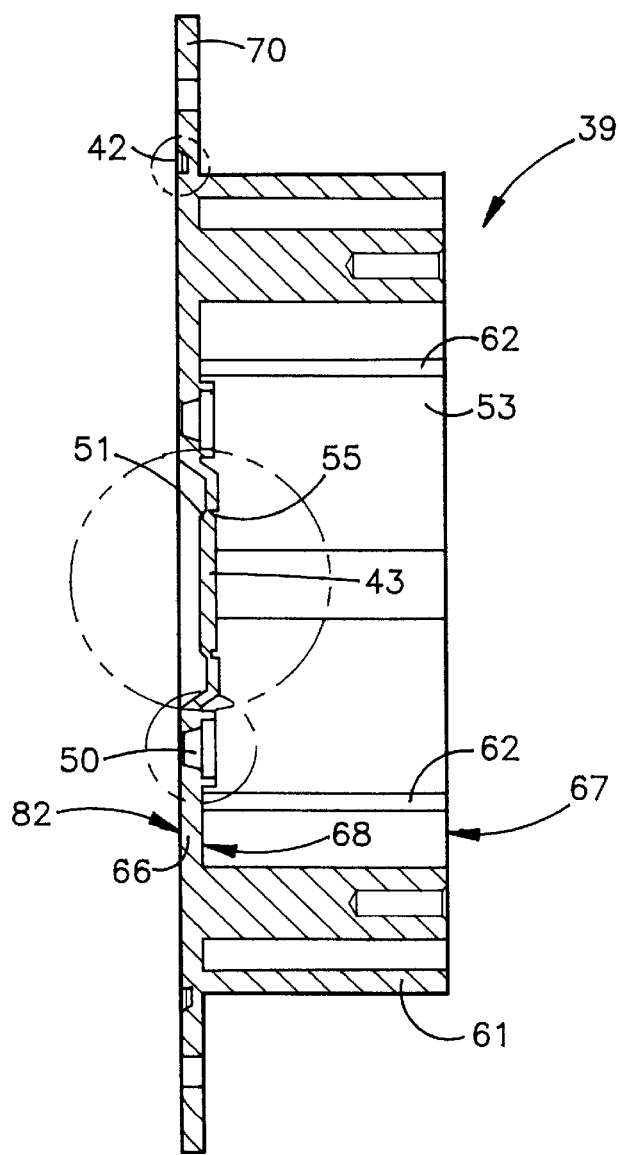
FIG. 15 is a cross-sectional view of the preferred embodiment of the mounting block taken along lines 15—15 of FIG. 14.

FIG. 15 is a cross-sectional view of the embodiment of the mounting block 39 taken along lines 15—15 of FIG. 14. As shown in FIG. 15, the knock-outs 43 of this embodiment 39 are recessed away from the rear surface 82 and into the interior cavity 53 of the mounting block 39 in a similar manner as 44 in FIG. 9. The recessed knock-out permits incoming wiring and cables to be secured to the mounting block 39 by flexible C-shaped snap clamps (not shown in the figure). After being snapped into the knock-out 43, the C-shaped clamp will not extend beyond the rear surface 82 of the mounting block, thereby allowing the mounting block to be installed in tighter spaces and also permitting faster installation of wiring as tightening of screw type clamps within the tight spaces between the mounting block and the surface to which it is mounted will not be required.

Figure 18:
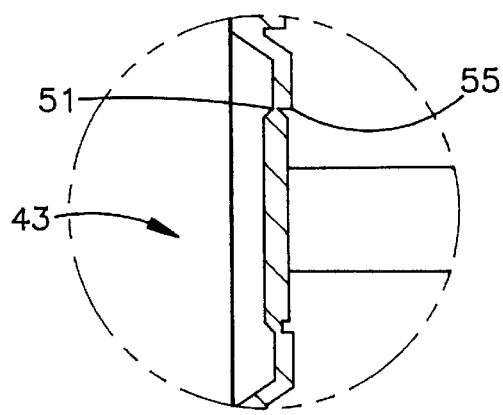
FIG. 18 is a detail view of the ¾ inch knock-out which is recessed into the back surface of the mounting block.

As shown in FIG. 18, a detail view of the ¾ inch knock-out, the knock-outs 43 are easily removed as a result of the thin wall 51 created by the small V-cut 55 molded around the periphery of the knock-out. The C-shaped clamp would snap into the hole created when the knock-out portion is removed.

Figure 16:
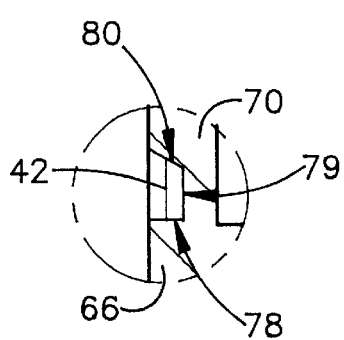
FIG. 16 is a detail view of a cutaway groove in the rear of the mounting block shown in FIG. 13.

FIG. 16 is a detail view of the cutaway groove 42 in the rear wall 66 of the mounting block 39 shown in FIG. 15. The cutaway groove 42 has a short side 78 and long side 80 of the groove. The cutaway groove 42 permits removal of the integral flange 70 by scoring with a knife along the groove bottom 79 and breaking away the flange 70 at the score marks. The preferred location of the score is at the juncture of the short side 78 and bottom 79 of the groove 42. This is the location that a knife blade would naturally run along as the short side 78 guides the knife edge as it is run along the groove.

Figure 17:
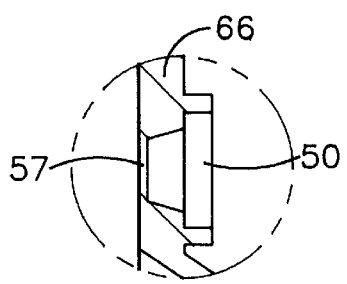
FIG. 17 is a detail view of a fastener recess molded into the rear wall in the inner cavity of the mounting block.

FIG. 17 is a detail view of a fastener recess 50 molded into the rear wall 66 in the inner cavity 53 of the preferred embodiment of the mounting block 39 of FIG. 15. The thin wall 57 portion at the bottom of the recess 50 is easily penetrated by a nail or drilled out for fastening with a screw. Several fastener recesses are provided in the rear wall 66 of the mounting block to enable securing of the block to a mounting surface.

The mounting block 39 of FIG. 15 is provided in two versions. One version is a deep block which forms a spacious cavity 53 for use with bulky electrical devices such as ground fault circuit interrupters. The depth of the cavity 53, from the front surface 68 of rear wall 66 to the edge 67 of the integral peripheral wall 61 of the mounting block 39 is typically 1.41 inches for the deep version of the mounting block 39 and typically 1.0 inches for the shallow version which suffices for most standard electrical receptacles and switches.

Figure 22:
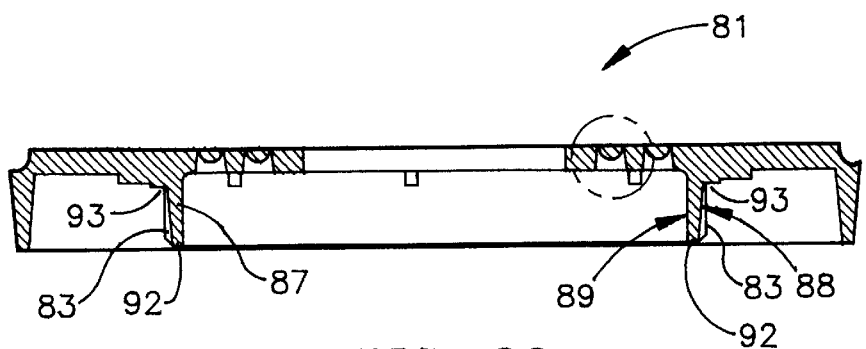
FIG. 22 is a cross-sectional view taken along lines 22—22 of FIG. 19.

FIG. 19 is a rear view of an embodiment of a face plate 81 that is used in conjunction with the above embodiment of the mounting block to create this embodiment of the two-piece siding box. An integral, peripheral wall 87 is located on the front surface 91 of the face plate 81. The face plate 81 of FIG. 19 is mated with the mounting block 39 of FIG. 15 by simply sliding the face plate onto the mounting block. The integral peripheral wall 87 of the face plate (FIG. 22) has integral ribs 83 on each side and the distance from the outer surface of a rib 83 on one side of the wall 87 to a rib 83 on the opposite side of the wall 87 is typically 4.200 inches at the outermost edge 92 of the peripheral wall 87. The integral peripheral wall 61 of the mounting block 39 (FIG. 15) is typically 4.269 inches. The integral peripheral wall 87 of the face plate 81 shown in FIG. 19 is therefore slidingly engaged within the integral peripheral wall 61 of the mounting block 39 shown in FIG. 15. Integral ribs 83 on the outer surface 88 of the peripheral wall 87 of the face plate 81 (FIG. 19) slidingly mate with integral ribs 62 on the inner surface 63 of the peripheral wall 61 of the mounting block 39 (FIG. 14). As shown in FIG. 22, a cross-sectional view of the face plate 81 taken along line 22—22 of FIG. 19, the distance across the ribs 83 at the edge 92 of the integral peripheral wall 87 is typically 4.200 inches. The distance across the ribs 83 at the base 93 of the wall is typically 4.235 inches. Referring to FIG. 14, the distance across the peripheral wall 61 of the mounting block from the inner surface 67 of one integral rib 62 to the inner surface 67 of the integral rib 62 opposite it is typically 4.235 inches. When the face plate and mounting block of this embodiment are mated then, the integral wall of the face plate at typically 4.200 inches across the outer surfaces of the ribs near the edge of the peripheral wall is easily started into the integral wall of the mounting block which is typically 4.235 inches across at the ribs of the mounting block. As the face plate is inserted farther within the mounting block, the distance across the ribs at the point that the base joins the face plate is typically 4.235 inches, and the face plate is gradually mated into a friction fit between the ribs on the face plate and the ribs on the mounting block. This prevents the face plate from being too loose within the mounting block when fully assembled.

Several features work in conjunction to enhance self-draining of rain or water so that this embodiment of the two-piece siding box does not require a gasket between the preferred embodiment of the face plate and the preferred embodiment of the mounting block. One of these features are the ribs 83 located on the outer surface 88 of the integral peripheral wall 87 of the face plate 81 (FIG. 19) and the ribs 62 located on the integral peripheral wall 61 of the mounting block 39 (FIG. 14). The ribs 87 of the face plate 81 mate with the ribs 62 of the mounting block 39 and thereby keep a separation between the outer surface 88 of the face plate's integral wall 87 and the inner surface 63 of the mounting block's integral wall 61. A raised lip 85 extends around a portion of the outer surface 88 of the face plate's integral wall 87 at its base. Water escape areas 86 are formed by allowing a gap between the raised lip 85 areas around the corners of the integral wall 94. Therefore, when face plate 81 (FIG. 19) is fully engaged in mounting block 39 (FIG. 14), the combination of the ribs on both the face plate and the mounting block and the raised lips 85 at the base of the integral wall 87 form a water escape area 86 at the corners 94 of the integral wall of the face plate 81. Any water that gets into the inner cavity formed by joining the face plate to the mounting block will drain out by force of gravity, regardless of which side of the siding box is on the bottom. The water will drain to the bottom of the cavity formed between the face plate and the mounting block then to the space between the face plate and the mounting block created by the contact of the ribs on each piece, and then out of the space between the face plate and the mounting block by flowing out the water escape area 86 (FIG. 19) located between the raised lips.

The face plate 81 as shown in FIG. 19 has a window 90 that allows access to the electrical or other device that will be mounted within the two-piece siding box. A typical sequence of installing the siding box would include removing one or more knock-outs 43 for the passage of wiring or cable, placing the mounting block 39 (FIG. 14) over an existing hole (not shown in FIG. 14) in an exterior wall having wiring or electrical cables protruding therefrom and positioning such that the wiring will easily enter through one of the holes created by removing a knock-out, securing the mounting block to the wall by nails or screws fastened through either the slots 48 in the integral flange 70 or the fastener recesses, connecting the wiring or cable to the proper screws on the electrical device being installed, installing the device such as a standard duplex electrical receptacle by fastening with screws into the single-hole bosses 45, mating the face plate 81 (FIG. 19) with the mounting plate 39 (FIG. 14) and slidingly engaging the two until a the face plate is inserted as far as possible within the mounting block, and then completing the installation by placing a long screw through the center of an electrical device cover of the proper type to match the device and then tightening the two together, thereby sandwiching the face plate between the cover and the electrical device and mounting block.

FIG. 20 is a detail view of two recessed sections 95 and a raised section 96 of the face plate shown in FIG. 19. The recessed sections 95 are areas that can be easily punched out with a hammer and a punch, screwdriver, or other similar tool to create a hole for mounting and securing devices into the bosses within the mounting block by a screwdriver passed through the hole in the face plate created by the knocked out recess. This allows access to the screws holding the electrical or other device without having to remove the face plate. Round shaped recessed areas 95 and oval shaped recessed areas 97 are both molded into the face plate 81 (FIG. 19) at the proper location to match up with holes in the bosses 45 of the mounting block 39 (FIG. 14).

FIG. 21 is a cross-sectional view taken along line 21—21 of FIG. 20. A recessed area 95 and a raised area 96 are shown. The raised area 96 is integral with the face plate 81.

FIG. 22 is a cross-sectional view of an embodiment of the face plate 81 taken along line 22—22 of FIG. 19 and depicts the integral wall 87, face plate ribs 83 extending from the base 93 to the edge 92 of the integral wall along the wall's outer surface 88, and the inner surface 89 of the wall 87.

Figure 23:
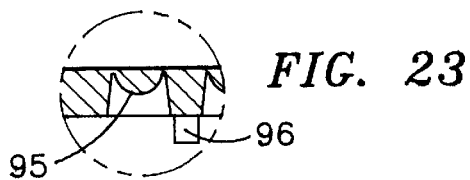
FIG. 23 is a detail view of the small knock-out shown in FIG. 22.

FIG. 23 is a detail view of the recessed area 95 and raised area 96 shown in the cross-sectional view of FIG. 22.

Figure 24:
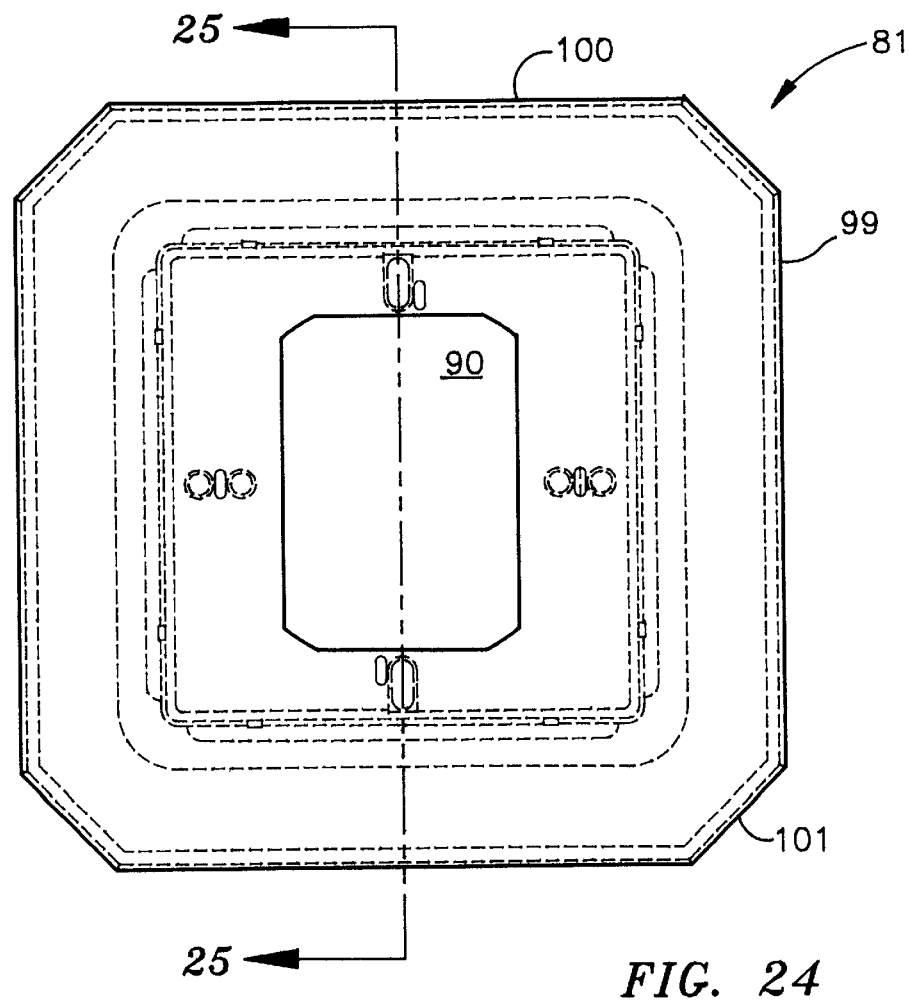
FIG. 24 is a front view of the embodiment shown in FIG. 19.

FIG. 24 is a front view of the embodiment of the face plate shown in FIG. 19. The face plate 81 is substantially flat across its front surface but may be decoratively textured. A window 90 is centered in the face plate 81 to provide access to any electrical or other device which may be mounted therein to the mounting block. The face plate 81 may be substantially any shape along edge 99 that is desired but typically is an octagon such as shown in FIG. 24 with four long 100 and four short 101 sides.

Figure 25:
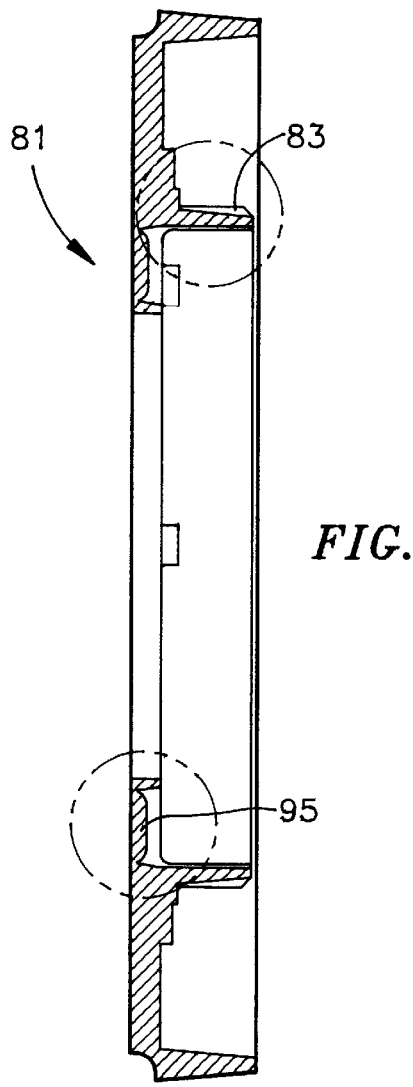
FIG. 25 is a cross-sectional view of the face plate taken along line 25—25 of FIG. 24.
Figure 26:
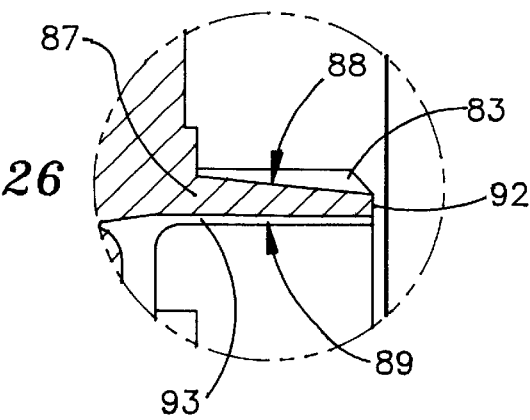
FIG. 26 is a detail view of the raised rib shown in FIG. 25.

FIG. 26 is a detail view of the face plate rib 83 shown in FIG. 25. The face plate rib 83 is integral with the outer surface 88 of the integral wall 87. The distance between the inner surface 89 and outer surface 88 of the integral wall 87 is typically 0.140 inch at the edge 92 and 0.158 at the base 93. This thickening of the rib 83 and wall 87 toward the base 93 causes the face plate 81 to form a friction fit between the ribs of the face plate and the ribs of the mounting block as the two are pushed together completely.

Figure 27:
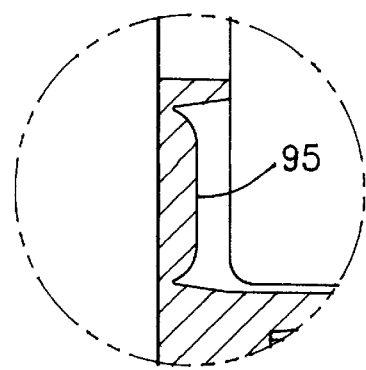
FIG. 27 is a detail view of the elongated knock-out shown in the lower portion of FIG. 25.

FIG. 27 is a detail view of an oval shaped recessed area 95 shown in the lower portion of FIG. 25.

Figure 28:
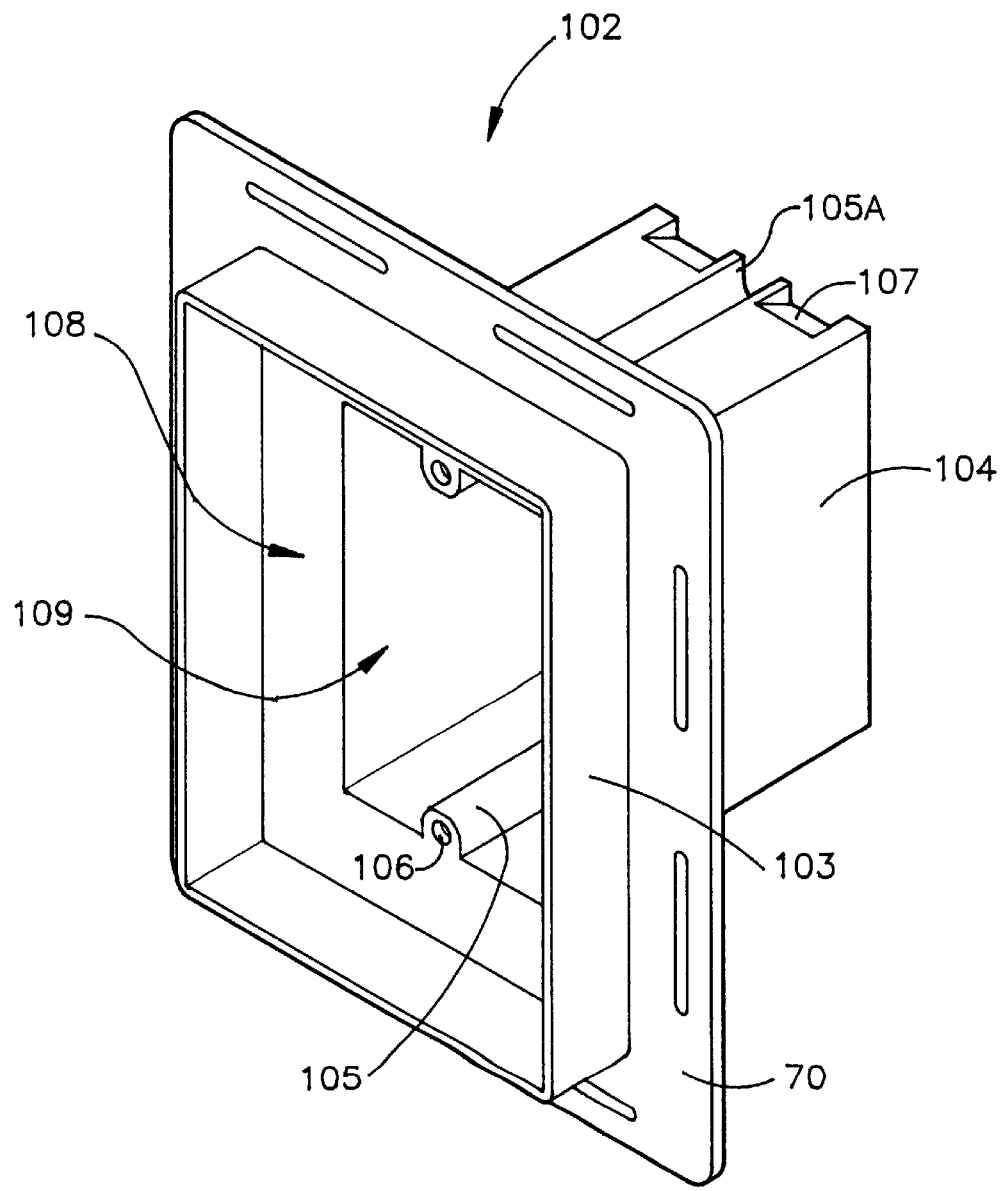
FIG. 28 is a perspective view of a further embodiment of the mounting block that may be sunk into a wall and provides a larger cavity for wiring and electrical devices.

FIG. 28 is a perspective view of another embodiment of the mounting block that may be sunk into a wall and provides a larger cavity for wiring and electrical devices. The mounting block 102 has an integral peripheral wall 103 which can mate with a properly sized face plate (not shown). The depth of the cavity 108 within the integral wall 103 is typically 0.812 inch, or not as deep as either the shallow (1.0 inch) or the deep (1.41 inches) version of the preferred embodiment of the mounting block 39 (FIG. 15). An extended cavity 109 for wiring however is provided by the extended portion 104 of the mounting block 102. This extended portion 104 provides a spacious extended cavity 109 as the depth of the extended portion 104, from the rear portion of extended flange 70 which includes breakaway grooves on the rear surface such as 42 of FIG. 9, to the face of the rear wall is typically 3.157 inches. The third embodiment of the mounting block 102 has bosses 105 containing holes 106 for mounting electrical devices. At the rear of the bosses is an open channel 105A which receives the length of the screw protruding beyond the hole 106. Rectangular shaped knock-outs 107 are provided at the rear of the mounting block 102 at the upper and lower corners.

Figure 29:
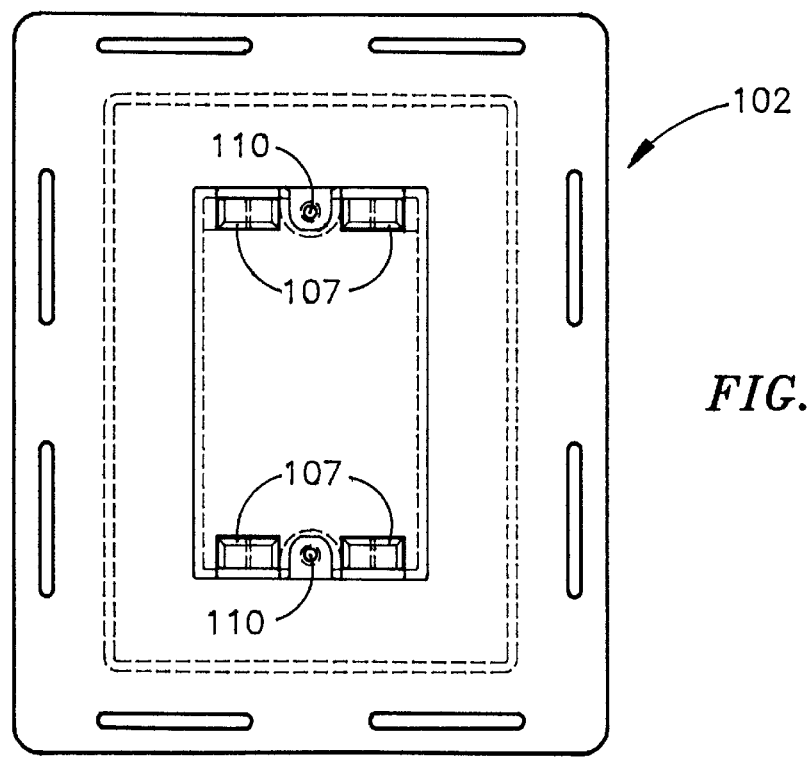
FIG. 29 is a rear view of the mounting block of FIG. 28.

FIG. 29 is a rear view of the mounting block 102 of FIG. 28. Four rectangular knock-outs 107 are provided for wiring and cable entry and two screw holes 110 for attaching the mounting block 102 to a wall or similar surface.

Figure 30:
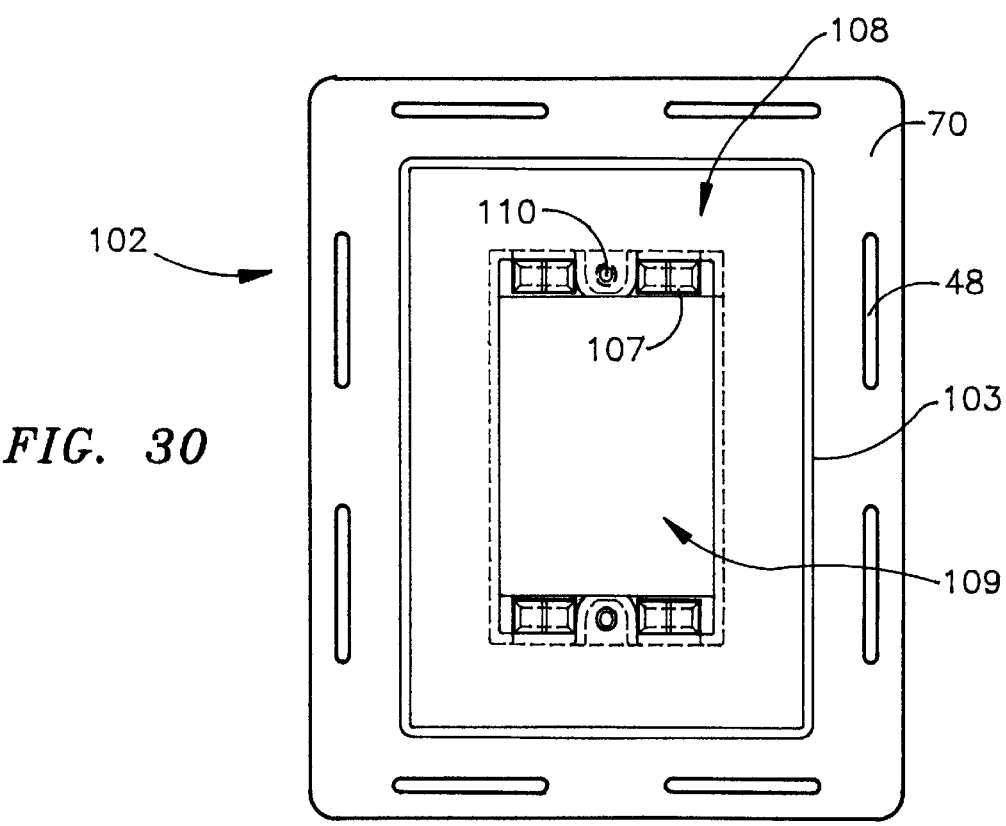
FIG. 30 is a front view of the mounting block of FIG. 28.

FIG. 30 is a front view of the mounting block 102 of FIG. 28 and shows the layout of the integral wall 103, integral flange 70 including slots 48, outer cavity 108, extended cavity 109, knock-outs 107 and screw holes 110.

Figure 31:
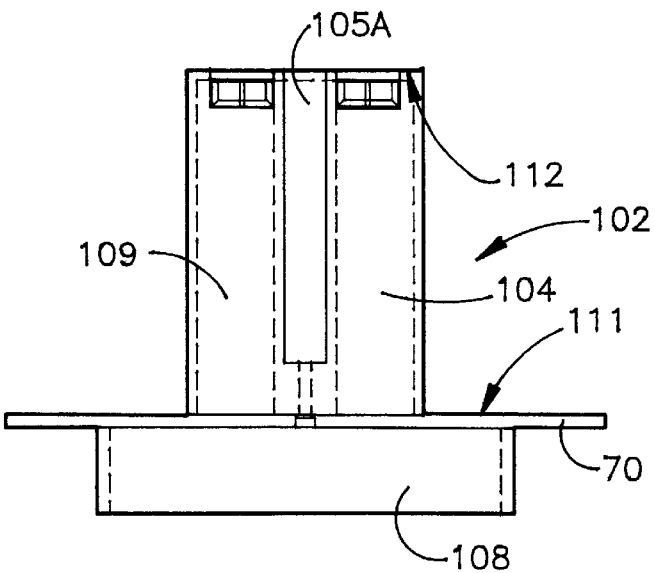
FIG. 31 is a top view of the mounting block of FIG. 28.

FIG. 31 is a top view of the mounting block of FIG. 28. The mounting block 102 has an outer cavity 108 depicted in dashed lines and an extended cavity 109 also depicted in dashed lines. The depth of the extended cavity 109 measured from the rear surface 111 of the integral flange 70 to the rear wall 112 of the extended portion 104 (shown in dashed lines) of the mounting block 102 is typically 3.157 inches.

Figure 32:
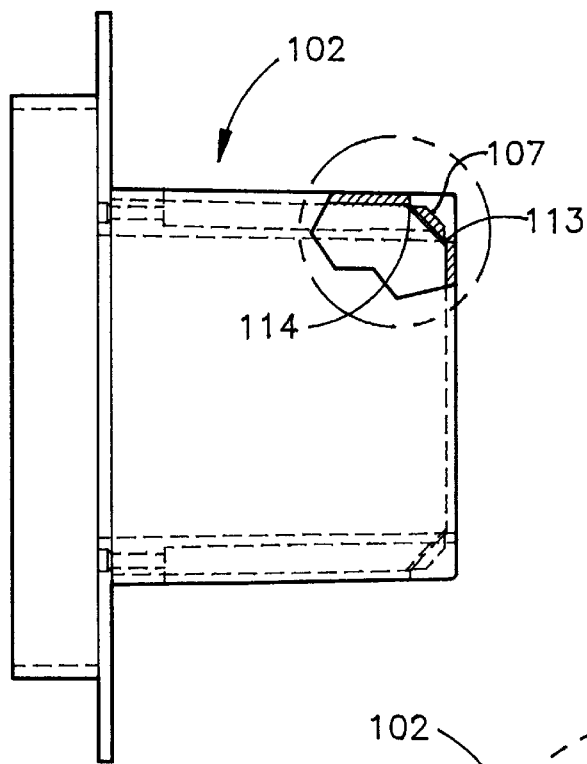
FIG. 32 is a side view of the mounting block of FIG. 28.

FIG. 32 is a side view of mounting block 102 of FIG. 28 including a cut away portion showing a cross sectional view of a rectangular knock-out 107. Wide V-cuts 113 form a thin wall portion 112. The thin wall portions 112 allow the knock-outs 107 to be easily punched out to give wiring access to the extended cavity 109.

Figure 33:
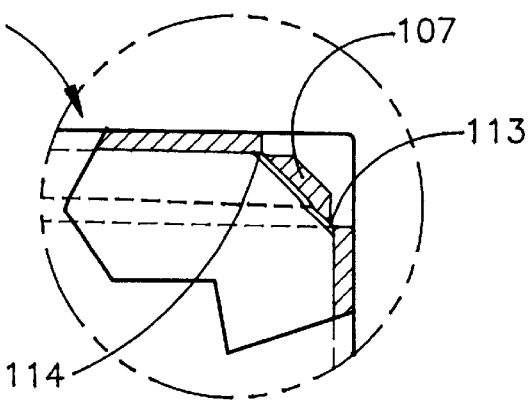
FIG. 33 is a detail view of the rectangular knock-out shown in FIG. 32.

FIG. 33 is a detail view of the rectangular knock-out shown in FIG. 32 and gives a closer view of the knock-out 107, wide V-cuts 113, and thin wall portion 112.

Figure 34:
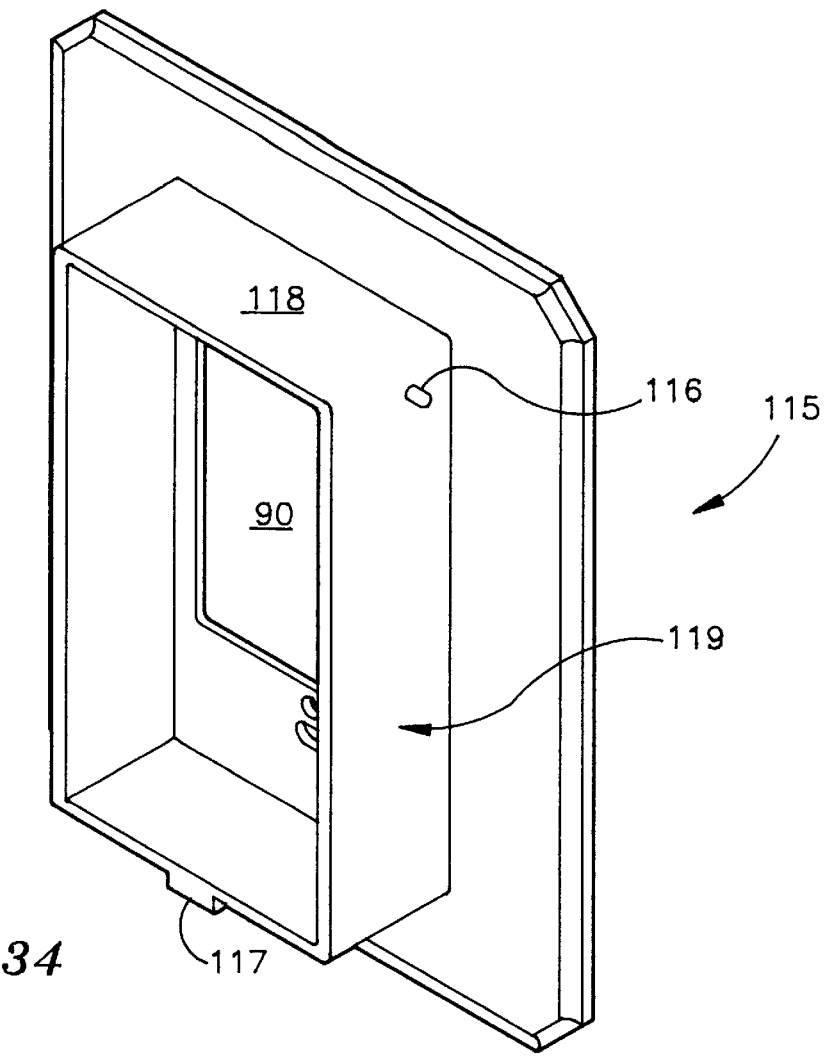
FIG. 34 is a perspective view of another embodiment of a face plate which allows attachment o f a weather-proof while-in-use cover.

FIG. 34 is a perspective view of a third embodiment of the face plate which allows attachment of a weather-proof while-in-use cover. The face plate 115 has an outer box 118 which has two coaxial 116 (one shown) from which a while-in-use-cover (not shown) can be pivotally connected about the pins. The pins 116 are preferably integral with the side portions 119 of the outer box 118 when the box is made of plastic. Also the pins 116 can be mounted by a friction fit or similar arrangement. The while-in-use-cover is used to protect the electrical device within, typically a duplex receptacle, and can be lifted and pivoted about the pins 116 to allow access to any cables that are plugged into the receptacle. The while-in-use-cover (not shown) will protect the cables and the receptacle from rain. Such a cover is similar to that shown in copending U.S. patent application Ser. No. 08/468,017 filed Jun. 6, 1995 and owned by the same assignee, which application is incorporated herein and made a part of this disclosure.

Figure 35:
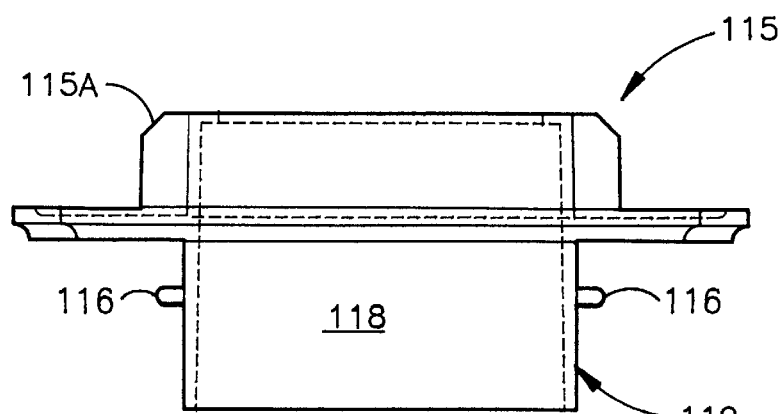
FIG. 35 is a top view of the face plate shown in FIG. 34.

FIG. 35 is a top view of the face plate 115 shown in FIG. 34 depicting the pins 116 integral with the side portions 119 and directly opposed from each other across the outer box 118.

FIG. 36 is a side view of the face plate 115 shown in FIG. 34 showing the arrangement of the ear 116 with respect to the lip 117.

FIG. 37 is a detail view of the lip 117 of the face plate shown in FIG. 34.

FIG. 38 is a front view of the face plate of FIG. 34 depicting the window 90 within the outer box 118 and the location of the ears 116 and lip 117.

Figure 39:
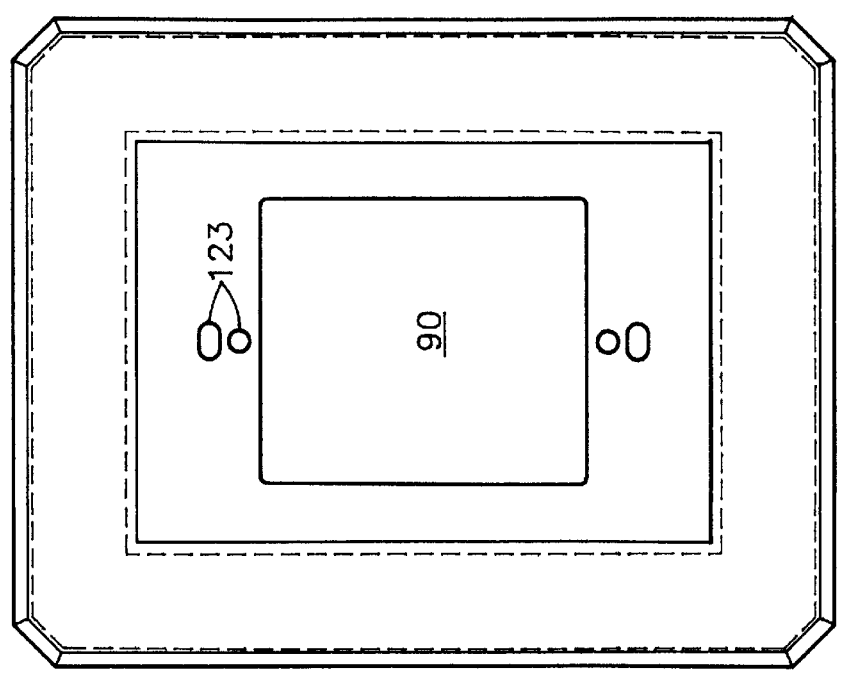
FIG. 39 is a front view of a further embodiment of a face plate which is used for a standard ground fault circuit interrupter (GFCI)

FIG. 39 is a front view of a fourth embodiment of the face plate which is used for a standard ground fault circuit interrupter (GFCI). The face plate 120 is used in conjunction with a mounting block (not shown) to mount electrical devices. The face plate 120 has a window 90 that allows access to any electrical device that may be mounted within. Holes 123 are molded into the face plate 120 to permit access to the screws that secure the electrical device to the mounting block.

Figure 41:
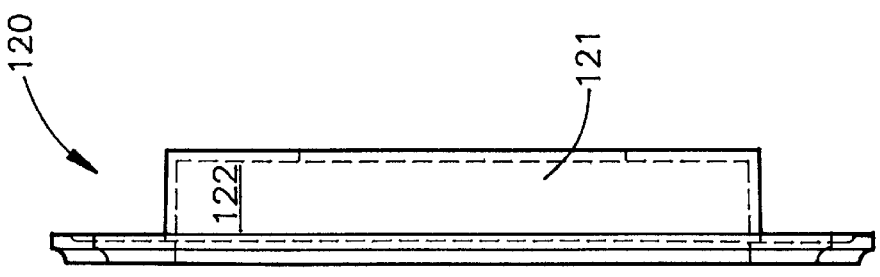
FIG. 41 is a side view of the embodiment of a face plate shown in FIG. 3 9.
Figure 40:
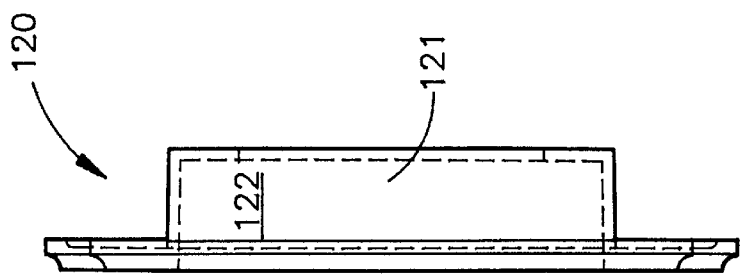
FIG. 40 is a top view of the embodiment of a face plate shown in FIG. 39.

FIG. 40 is a top view of the embodiment of the face plate shown in FIG. 39. FIG. 41 is a side view of the embodiment of the face plate shown in FIG. 39. Both figures show the outline (in dashed lines) of a cavity 121 formed within the integral peripheral wall 122 of the face plate 120.

Figure 42A:
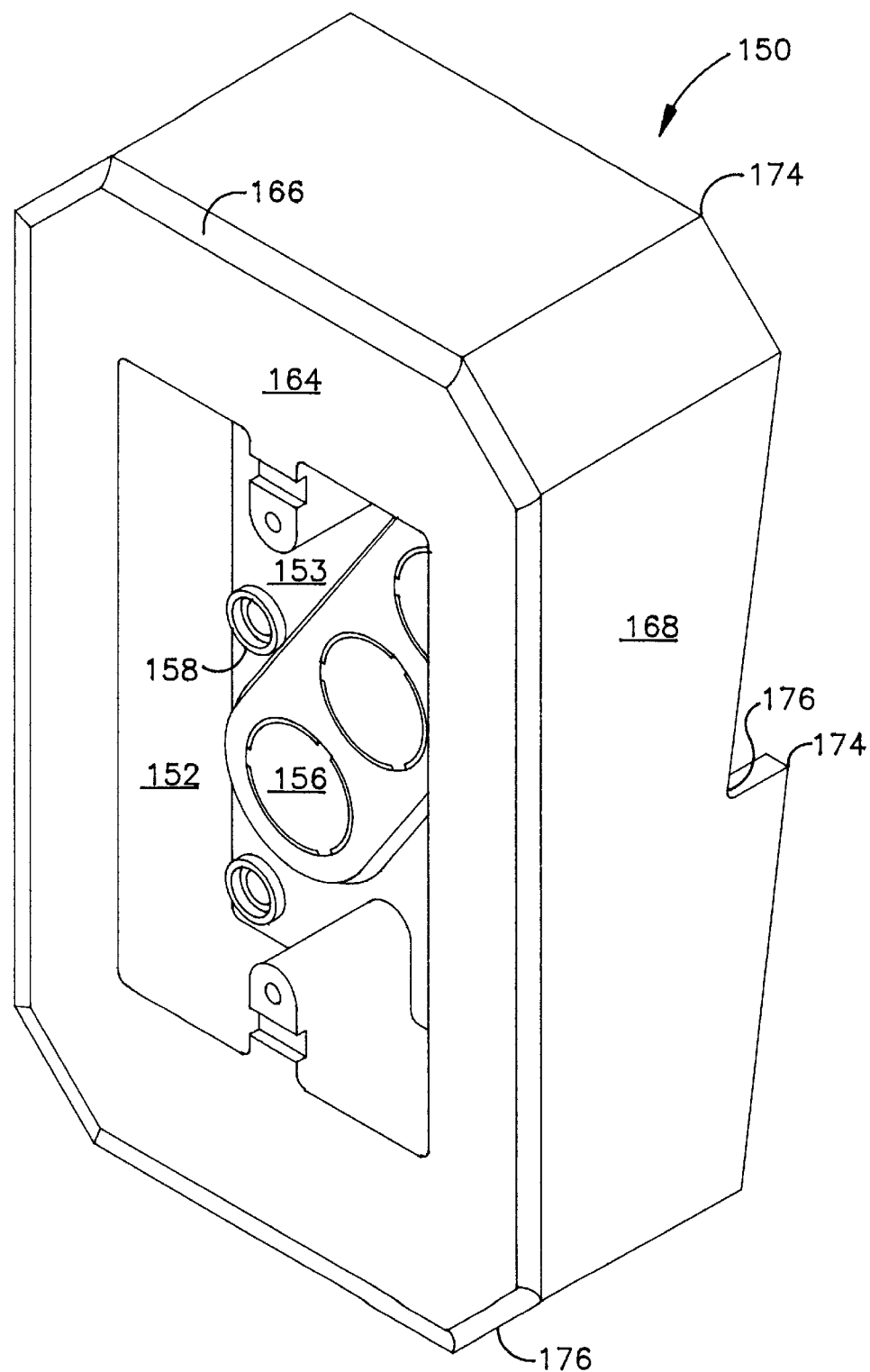
FIG. 42A is a perspective view of another embodiment of a mounting block.

FIG. 42A is a perspective view of another embodiment.

Figure 46A:
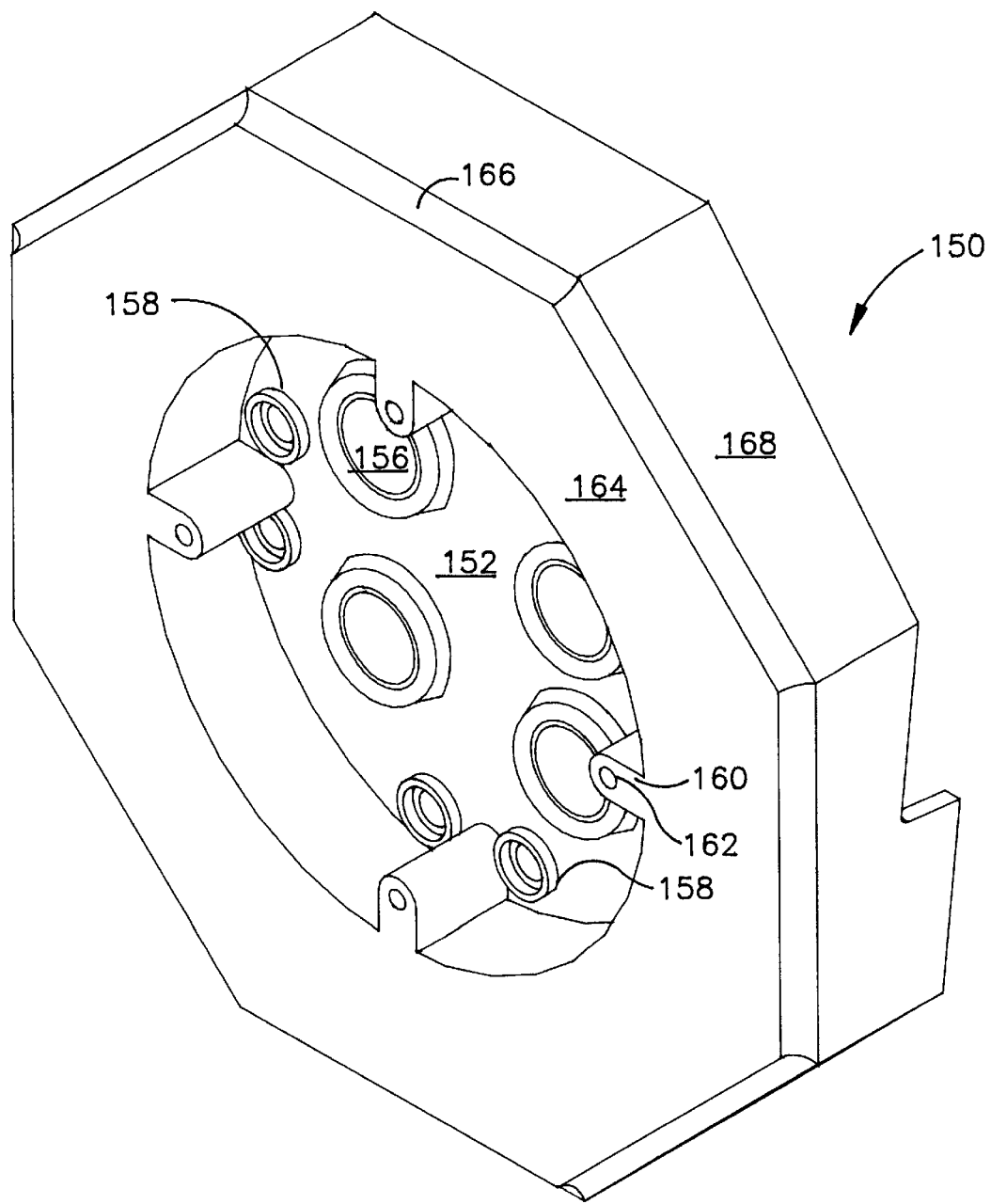
FIG. 46A is a perspective view of another mounting block.
Figure 46B:
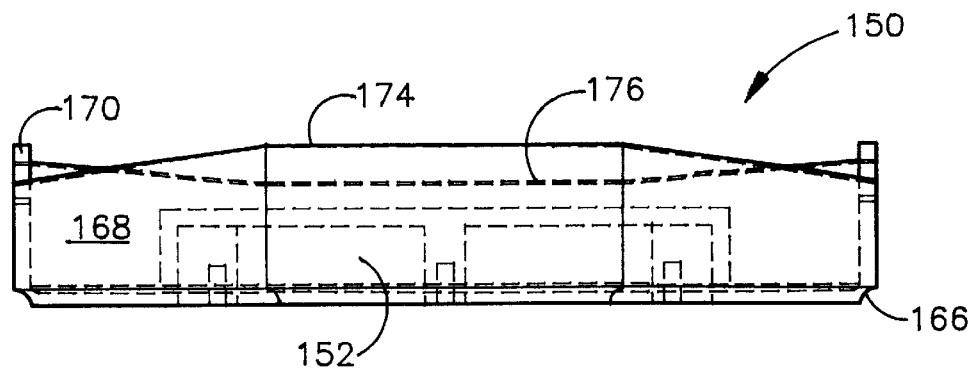
FIG. 46B is a top view of a hexagonal one-piece siding mounting block of FIG. 46A.
Figure 47:
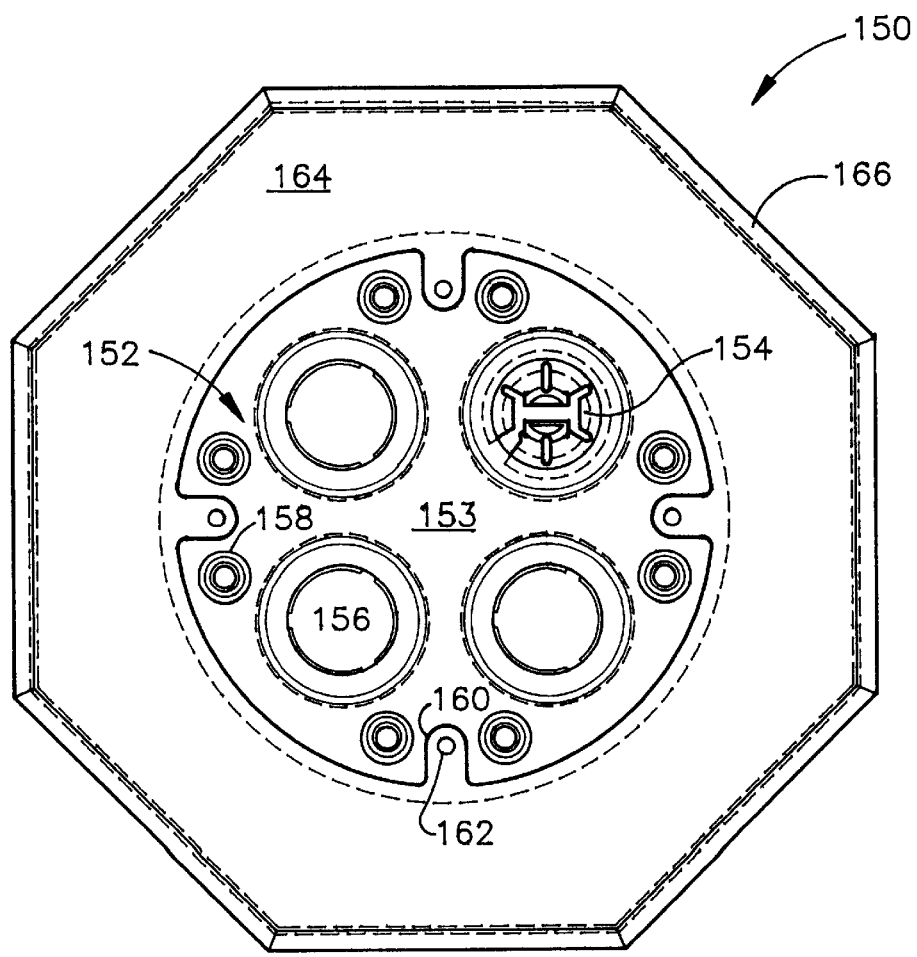
FIG. 47 is a plan view of the block of FIG. 46A.

FIG. 46A is a perspective view of a hexagonal embodiment.

With reference to FIGS. 42A through FIG. 45, there is shown an embodiment of the invention is a one-piece plastic mounting block 150 that includes an electrical outlet box adapted to fit onto the exterior of a shingled home or other shingled building without the need to cut any mounting holes into the outside surface of the shingled side. This is of special advantage to the do-it-yourself home market as it makes a simple and easy installation to add an outlet on the siding of the house. All that is necessary is to drill a small hole through the siding and bring the cable right under a notch under the shingle and through a recessed knock-out in the rear the mounting block. Screws are then used to fasten the mounting block directly over the shingled siding. The wire is then wired into the electrical device. The shingled siding does not have to be cut, although it may be desired to caulk around the small diameter hole from which the wire exits and if desired the outside of the mounting block can also be caulked. However, water coming down the shingles usually missed the mounting block 150, which functions as an outlet box and drains right out the front of the shingled siding.

Optionally, mounting block 150 can have added to its exterior an adapter kit such as shown in the co-pending U.S. patent application Ser. No. 08/468,017 mentioned above or a conventional double-door configuration with a gasket which is readily available from building supply dealers.

As shown in FIG. 42A the plastic mounting box has a recessed cavity 152 or electrical outlet box with a rear wall 153 for the wiring attached to the electrical device and has a recessed knock-out 156 which is better shown in FIGS. 42B and 43, which uses low profile connectors 154 of the type shown in U. S. Pat. Nos. 5,442,141 and 5,693,910 mentioned earlier. The recessed knock-outs 156 are three in number but can be any number desired. Six screw receiving holes 158 are used for attaching the mounting block to the building. Also mounting block has two bosses 160 which have screw receiving holes 162 to which various electrical devices may be attached. Surrounding the recessed cavity 152 an integral therewith is a planar area 164 surrounded by a decorative edge 166. This planar area 114 serves as a surface to permit the use of cover plates or other attachments with the mounting block 150. The outer periphery or an integral continuous wall 168 is perpendicular to the wall to which the mounting block will be attached and extends around the entire outer edge of the planar area 164 of the mounting block 150. The inside or rear wall 170 of the outer periphery or an integral continuous wall 168 is shaped so as to be complimentary to the surface of the shingled siding to which it is attached. As seen in FIG. 43 the rear wall has its greatest depth at the top and other recesses such as recess 174 under the shingles. The rear wall 170 is slanted outwardly to its shallowest depth at 176 where the outermost edge or bottom of the shingle protrudes. The rear profile or wall of the mounting block follows the shingled contour to the greatest depth underneath the edge of the shingle. The rear wall then is slanted to follow the shingle until it reaches its outermost point 176.

Figure 44:
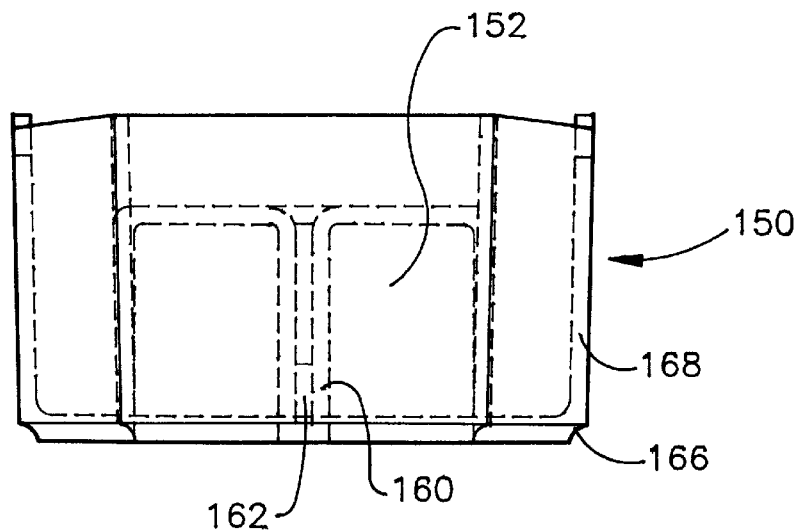
FIG. 44 is a view of the end of FIG. 42.
Figure 45:
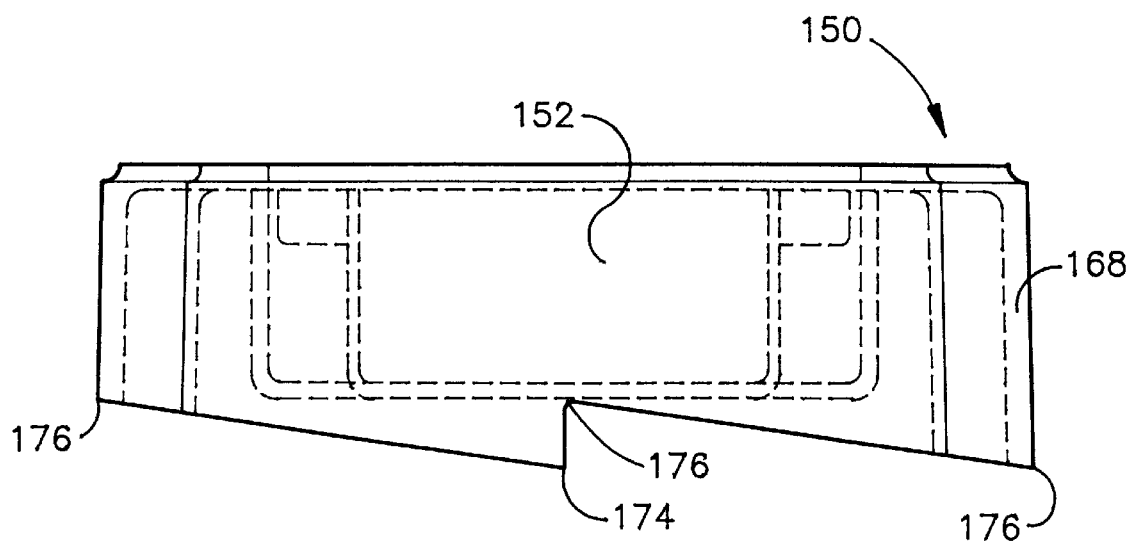
FIG. 45 is a view from the side of FIG. 42.

FIGS. 44 and 45 show a top and side view of the mounting block of FIG. 42A with the dashed lines showing the interior surfaces.

With reference to FIG. 46A through FIG. 49 there is shown an octagonal mounting block 150 similar to that of FIG. 42A and like parts carry the same numbers. As shown in the mounting block 150 a recessed cavity 152, low profile connectors 154 and recessed knock-outs 156. The screw receiving holes 158 are eight in number with only four being shown in FIG. 46A. There are four bosses 160 and four screw receiving holes 162 for the mounting of electrical devices. In this case the planar area 164 is octagonally shaped and runs parallel to the outer surface of the building to which it will be attached. The decorative edge 166 is the outermost edge of the outer periphery 168 which periphery extends to the rear towards the side of the shingled building. The rear wall 170 of the outer periphery shown is at its greatest depth at the outermost point 176 and its most shallow depth at 174 so as to once again compliment the outer shingle surface of the building.

Figure 48:
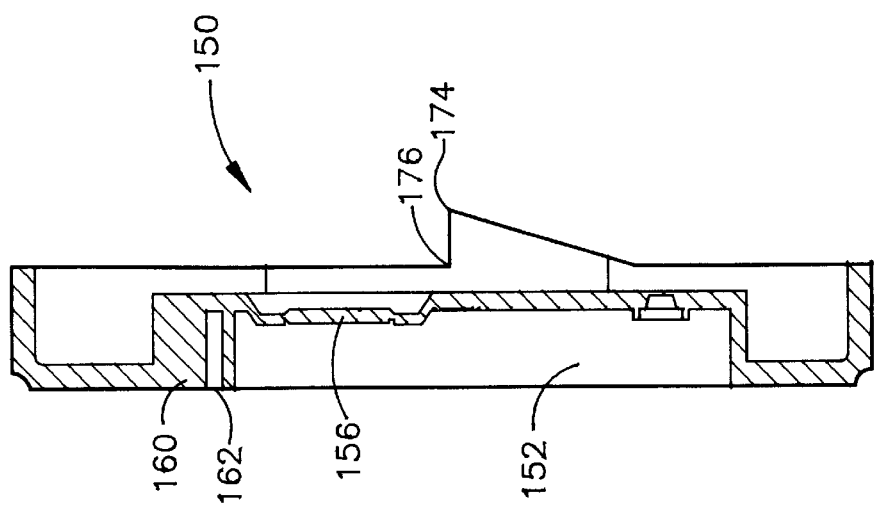
FIG. 48 is a random cross-sectional view of FIG. 47.
Figure 49:
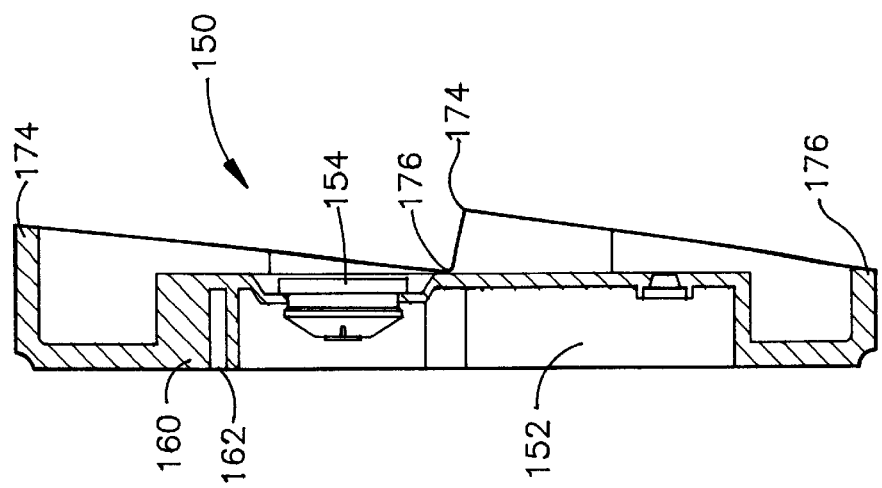
FIG. 49 is another random cross-sectional view of FIG. 47.

The profile shown in FIG. 48 represents the profile of a typical half inch or five eights inch lap siding and the profile as shown in FIG. 49 represents the profile of a typical dutch lap siding.

Having thus described the invention with reference to a preferred embodiments, it is to be understood that the invention is not so limited by the description herein but is defined as follows by the appended claims.

What is claimed is:

1. A two-piece siding box comprising:

a mounting block including a rear wall with an integral continuous peripheral wall extending perpendicular from said rear wall, said integral continuous peripheral wall having an inner surface and an outer surface, said mounting block including at least one recessed knock-out section in said rear wall recessed towards said front surface thereby creating a center knock-out section that allows a flush connection by a low profile connector to permit flush mounting of said siding box;

a face plate having a back surface and including an integral continuous peripheral wall extending perpendicular from said back surface, said continuous peripheral wall of said face plate sized such that it may be slidingly received by said continuous peripheral wall of said mounting block, said face plate having a window centered in it within said continuous peripheral wall of said face plate;

bosses extending from said rear wall of said mounting block, said bosses being within said integral peripheral wall of said mounting block; and an electrical device connected to an electrical source by leads through said at least one knockout section, said electrical device fastened to said mounting block with screws tightened into one or more of said bosses.

2. The two-piece siding box of claim 1 which includes breakaway grooves on said back surface of said face plate for allowing selective removal of center portions of said face plate to facilitate passage of different devices therethrough.

3. The two-piece siding box of claim 1 which includes a standard size opening in said face plate for allowing passage of different devices therethrough.

4. The two-piece siding box of claim 1 which further includes:

a plurality of bosses integral with and extending from said front surface of said mounting block within said peripheral wall;

screw receiving holes in said bosses;

said electrical device aligned on said face plate; and said screws for securing said electrical device to said mounting block whereby said face plate is sandwiched between said mounting block and said electrical device and said face plate is visible only from a fixture breakaway portion to the outer periphery of said face plate.

5. The two-piece siding box of claim 1 which further includes:

an integral flange extending outwardly of said peripheral wall of said siding box in the same plane as said rear wall; and breakaway grooves in said rear wall for removing said flange from said siding box at a position located immediately outside said peripheral wall.

6. A siding box comprising:

a box having a recessed cavity and a rear wall including a front surface, side walls and an opening;

an integral continuous peripheral planar wall surrounding said opening;

an integral continuous wall for use on shingled walls having a rear edge extending perpendicular inwardly towards said planar wall at the outer periphery thereof and said rear edge conforming to the profile of said shingled walls to which it may be attached.

7. The siding box of claim 6 wherein said rear wall of said recessed cavity includes knock-outs which are recessed toward said front surface; thereby creating a recessed knock-out that allows a flush connection by a low profile connector to permit flush mounting of said siding box.

* * * * *